United States Patent
Nonaka et al.

(10) Patent No.: US 10,213,046 B2
(45) Date of Patent: Feb. 26, 2019

(54) COOKING APPARATUS, INFORMATION DISPLAY APPARATUS, CONTROL METHOD, COOKING TOOL, AND NON-TRANSITORY COMPUTER-READABLE RECORDING MEDIUM

(71) Applicant: Panasonic Intellectual Property Corporation of America, Torrance, CA (US)

(72) Inventors: Masao Nonaka, Osaka (JP); Mitsuhiro Aso, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/746,800

(22) Filed: Jun. 22, 2015

(65) Prior Publication Data
US 2015/0374162 A1    Dec. 31, 2015

(30) Foreign Application Priority Data

Jun. 30, 2014 (JP) .................................. 2014-134365
Apr. 24, 2015 (JP) .................................. 2015-089461

(51) Int. Cl.
*A47J 27/62* (2006.01)

(52) U.S. Cl.
CPC ....................................... *A47J 27/62* (2013.01)

(58) Field of Classification Search
CPC .......... A47J 27/62; A47J 37/108; A47J 36/00; A47J 36/165; A47J 43/0465; A47J 27/57; A47J 27/04; G05B 15/02; H05B 6/062; H05B 2213/07; H05B 3/685; H05B 3/746; H05B 6/1209; H05B 2213/06
USPC .................. 99/331, 337, 341, 342, 344, 348
See application file for complete search history.

(56) References Cited

U.S. PATENT DOCUMENTS 3,611,336 A * 10/1971 Chen ....................... F24C 3/128
126/299 R
4,389,706 A * 6/1983 Gomola ................. G05B 21/02
700/1
4,658,348 A * 4/1987 Flanagan ............... G05B 15/02
700/17

(Continued)

FOREIGN PATENT DOCUMENTS

JP    2002-290955    10/2002
JP    2003-214628    7/2003

*Primary Examiner* — Eric Stapleton
(74) *Attorney, Agent, or Firm* — Greenblum & Bernstein, P.L.C.

(57) ABSTRACT

A cooking apparatus includes a communicator that communicates with a terminal, a link-state manager that manages link-state information indicating whether or not a link to the terminal is active, a heater that performs a heating operation on a cooking tool, a receiver that receives a user operation, and a controller that controls the communicator or the heater which is a control target, on the basis of the user operation. In the case where the link is active, when the user operation is performed on the receiver, the controller causes the communicator to transmit instruction information to the terminal. The instruction information indicates an instruction to switch an image being displayed on the information display apparatus from a first image to a second image.

6 Claims, 15 Drawing Sheets

(56) References Cited

U.S. PATENT DOCUMENTS

| | | | | |
|---|---|---|---|---|
| 5,103,391 A * | 4/1992 | Barrett | G05B 15/02 | 165/238 |
| 5,311,451 A * | 5/1994 | Barrett | G05D 23/1905 | 165/238 |
| 6,268,853 B1 * | 7/2001 | Hoskins | G05B 15/02 | 700/83 |
| 6,453,687 B2 * | 9/2002 | Sharood | F25D 29/00 | 62/127 |
| 6,480,753 B1 * | 11/2002 | Calder | G06Q 10/107 | 219/679 |
| 6,539,842 B1 * | 4/2003 | Chapman | A47J 37/041 | 374/155 |
| 6,559,882 B1 * | 5/2003 | Kerchner | H05B 6/6435 | 219/506 |
| 6,587,739 B1 * | 7/2003 | Abrams | G05B 15/02 | 340/12.32 |
| 6,622,925 B2 * | 9/2003 | Carner | G05D 23/1905 | 165/209 |
| 6,807,463 B1 * | 10/2004 | Cunningham | H04L 12/2803 | 318/560 |
| 7,006,881 B1 * | 2/2006 | Hoffberg | G05B 15/02 | 700/17 |
| 7,020,697 B1 * | 3/2006 | Goodman | G06Q 10/06 | 709/223 |
| 7,069,091 B2 * | 6/2006 | Williamson | H05B 6/688 | 219/697 |
| 7,110,829 B2 * | 9/2006 | Cunningham | H04B 3/542 | 340/12.32 |
| 7,117,051 B2 * | 10/2006 | Landry | H04L 12/2818 | 700/83 |
| 7,467,198 B2 * | 12/2008 | Goodman | G06Q 10/06 | 709/223 |
| 7,703,389 B2 * | 4/2010 | McLemore | A47J 37/1209 | 340/501 |
| 8,118,238 B2 * | 2/2012 | Nordberg | G05B 15/02 | 236/51 |
| 8,334,779 B2 * | 12/2012 | Zerhusen | A47B 23/046 | 340/573.1 |
| 8,572,778 B2 * | 11/2013 | Newkirk | A61G 7/018 | 5/600 |
| 8,594,850 B1 * | 11/2013 | Gourlay | G05B 15/02 | 700/276 |
| 8,688,277 B2 * | 4/2014 | Studor | A47J 31/44 | 422/62 |
| 8,711,152 B2 * | 4/2014 | Masuda | G06T 13/80 | 345/473 |
| 8,783,243 B2 * | 7/2014 | Hodapp, Jr. | F24C 3/126 | 126/39 BA |
| 8,816,828 B2 * | 8/2014 | Ebrom | G06F 9/54 | 340/12.23 |
| 8,854,480 B2 * | 10/2014 | Yumiki | H04N 1/00442 | 348/207.2 |
| 8,924,269 B2 * | 12/2014 | Seubert | G06Q 10/06 | 705/35 |
| 8,931,400 B1 * | 1/2015 | Allen | H04Q 9/00 | 340/870.09 |
| 8,931,473 B2 * | 1/2015 | Baier | F24C 3/126 | 126/39 BA |
| 9,022,778 B2 * | 5/2015 | Schlachter | F23N 5/022 | 431/73 |
| 9,111,440 B2 * | 8/2015 | Park | G08C 17/02 | |
| 9,118,786 B2 * | 8/2015 | Nakamura | H04N 7/144 | |
| 9,119,505 B2 * | 9/2015 | Guard | A47J 31/4492 | |
| 9,329,714 B2 * | 5/2016 | Ishihara | G06F 3/041 | |
| 9,470,922 B2 * | 10/2016 | Otake | G02F 1/13338 | |
| 9,494,625 B2 * | 11/2016 | Doi | G01D 4/002 | |
| 2001/0010032 A1 * | 7/2001 | Ehlers | G05B 15/02 | 702/62 |
| 2001/0018625 A1 * | 8/2001 | Ichikawa | G05B 15/02 | 700/213 |
| 2001/0056314 A1 * | 12/2001 | Lomonaco | F24F 11/0001 | 700/276 |
| 2002/0016725 A1 * | 2/2002 | Eichstaedt | G05B 15/02 | 705/7.29 |
| 2002/0030578 A1 * | 3/2002 | Morita | G05B 15/02 | 340/3.52 |
| 2002/0196705 A1 * | 12/2002 | Jersey | A47J 43/0465 | 366/274 |
| 2003/0094448 A1 * | 5/2003 | Shukla | H05B 1/0266 | 219/487 |
| 2004/0021679 A1 * | 2/2004 | Chapman | G05B 15/02 | 715/700 |
| 2004/0032421 A1 * | 2/2004 | Williamson | G06F 17/30017 | 715/704 |
| 2004/0153804 A1 * | 8/2004 | Blevins | G05B 15/02 | 714/33 |
| 2004/0156311 A1 * | 8/2004 | Hirano | G05B 15/02 | 370/217 |
| 2004/0176858 A1 * | 9/2004 | Kuwahara | G05B 15/02 | 700/9 |
| 2004/0260407 A1 * | 12/2004 | Wimsatt | G05B 15/02 | 700/19 |
| 2005/0158701 A1 * | 7/2005 | West | C12M 41/48 | 435/3 |
| 2005/0240312 A1 * | 10/2005 | Terry | F25B 49/005 | 700/276 |
| 2005/0258260 A1 * | 11/2005 | Ahmed | F23N 5/20 | 236/51 |
| 2005/0258961 A1 * | 11/2005 | Kimball | G06Q 10/087 | 340/572.1 |
| 2005/0267605 A1 * | 12/2005 | Lee | G05B 15/02 | 700/19 |
| 2005/0278047 A1 * | 12/2005 | Ahmed | G05B 15/02 | 700/97 |
| 2005/0289467 A1 * | 12/2005 | Imhof | G05B 15/02 | 715/734 |
| 2006/0009861 A1 * | 1/2006 | Bonasia | H04L 12/2809 | 700/18 |
| 2006/0058900 A1 * | 3/2006 | Johanson | G05B 15/02 | 700/83 |
| 2006/0059253 A1 * | 3/2006 | Goodman | G06Q 10/06 | 709/223 |
| 2006/0123124 A1 * | 6/2006 | Weisman | G06F 9/4411 | 709/227 |
| 2006/0203295 A1 * | 9/2006 | D'Silva | A61B 5/7475 | 358/403 |
| 2006/0259332 A1 * | 11/2006 | Brown | B25F 5/00 | 705/3 |
| 2007/0055759 A1 * | 3/2007 | McCoy | G05B 19/042 | 709/223 |
| 2007/0067062 A1 * | 3/2007 | Mairs | G09B 25/04 | 700/275 |
| 2007/0111767 A1 * | 5/2007 | Brown | A63B 24/0003 | 463/1 |
| 2007/0160022 A1 * | 7/2007 | McCoy | H04L 12/2803 | 370/338 |
| 2007/0208438 A1 * | 9/2007 | El-Mankabady | G05B 15/02 | 700/83 |
| 2007/0240173 A1 * | 10/2007 | McCoy | H04L 12/2816 | 719/329 |
| 2007/0288331 A1 * | 12/2007 | Ebrom | D06F 33/02 | 705/27.1 |
| 2007/0298405 A1 * | 12/2007 | Ebrom | G09B 25/00 | 434/365 |
| 2008/0120129 A1 * | 5/2008 | Seubert | G06Q 10/06 | 705/35 |
| 2008/0167756 A1 * | 7/2008 | Golden | G05B 15/02 | 700/297 |
| 2008/0209342 A1 * | 8/2008 | Taylor | G05B 15/02 | 715/747 |
| 2008/0243391 A1 * | 10/2008 | Ohshiro | G08B 25/00 | 702/2 |
| 2009/0113049 A1 * | 4/2009 | Nasle | G05B 13/026 | 709/224 |
| 2009/0198111 A1 * | 8/2009 | Nearman | A61B 1/267 | 600/300 |
| 2009/0222142 A1 * | 9/2009 | Kao | G05B 15/02 | 700/291 |

(56) References Cited

U.S. PATENT DOCUMENTS

| | | | |
|---|---|---|---|
| 2010/0094475 A1* | 4/2010 | Masters | G06F 1/26 700/292 |
| 2010/0106308 A1* | 4/2010 | Filbeck | G05B 15/02 700/276 |
| 2010/0106310 A1* | 4/2010 | Grohman | F24F 11/0009 700/276 |
| 2010/0106316 A1* | 4/2010 | Curry | G05B 15/02 700/276 |
| 2010/0106322 A1* | 4/2010 | Grohman | G05B 15/02 700/276 |
| 2010/0106323 A1* | 4/2010 | Wallaert | G05B 15/02 700/276 |
| 2010/0106325 A1* | 4/2010 | Grohman | G05B 15/02 700/276 |
| 2010/0106326 A1* | 4/2010 | Grohman | G05B 15/02 700/276 |
| 2010/0106327 A1* | 4/2010 | Grohman | G05B 15/02 700/276 |
| 2010/0106334 A1* | 4/2010 | Grohman | G05B 15/02 700/278 |
| 2010/0106787 A1* | 4/2010 | Grohman | G05B 15/02 709/206 |
| 2010/0179696 A1* | 7/2010 | Grohman | G05B 15/02 700/276 |
| 2010/0192939 A1* | 8/2010 | Parks | F23N 1/002 126/39 BA |
| 2010/0262313 A1* | 10/2010 | Chambers | G05B 15/02 700/295 |
| 2010/0313768 A1* | 12/2010 | Koether | A47J 27/62 99/325 |
| 2011/0046792 A1* | 2/2011 | Imes | F24F 11/006 700/278 |
| 2011/0093099 A1* | 4/2011 | Tran | G05B 15/02 700/90 |
| 2011/0115816 A1* | 5/2011 | Brackney | G06Q 10/06 345/629 |
| 2011/0125328 A1* | 5/2011 | Lingrey | G05B 15/02 700/276 |
| 2011/0166689 A1* | 7/2011 | Alden | G05B 15/02 700/108 |
| 2011/0175750 A1* | 7/2011 | Anderson | G01D 4/004 340/870.16 |
| 2011/0182094 A1* | 7/2011 | Lumsden | H02J 1/14 363/126 |
| 2011/0184574 A1* | 7/2011 | Le Roux | G01D 4/004 700/291 |
| 2011/0202177 A1* | 8/2011 | Elizarov | B01J 19/0093 700/268 |
| 2011/0202185 A1* | 8/2011 | Imes | G05B 15/02 700/277 |
| 2012/0054125 A1* | 3/2012 | Clifton | G05B 15/02 705/412 |
| 2012/0064923 A1* | 3/2012 | Imes | G05B 15/02 455/457 |
| 2012/0065796 A1* | 3/2012 | Brian | H02J 3/14 700/295 |
| 2012/0072030 A1* | 3/2012 | Elliott | G05B 15/02 700/276 |
| 2012/0078426 A1* | 3/2012 | Macey | H04L 12/2825 700/286 |
| 2012/0102993 A1* | 5/2012 | Hortin | F25D 23/126 62/189 |
| 2012/0123594 A1* | 5/2012 | Finch | G05B 15/02 700/278 |
| 2012/0130513 A1* | 5/2012 | Hao | G05B 15/02 700/90 |
| 2012/0130546 A1* | 5/2012 | Matas | F24F 11/0012 700/276 |
| 2012/0147013 A1* | 6/2012 | Masuda | G06T 13/80 345/473 |
| 2012/0154128 A1* | 6/2012 | Cho | G05B 15/02 340/12.5 |
| 2012/0179547 A1* | 7/2012 | Besore | G06Q 30/0261 705/14.58 |
| 2012/0197449 A1* | 8/2012 | Sanders | G05B 15/02 700/291 |
| 2012/0232969 A1* | 9/2012 | Fadell | G06Q 10/20 705/14.4 |
| 2012/0256009 A1* | 10/2012 | Mucignat | G05D 23/1905 236/1 C |
| 2012/0286924 A1* | 11/2012 | Goto | G05B 15/02 340/4.31 |
| 2013/0060390 A1* | 3/2013 | Sogo | G05B 15/02 700/286 |
| 2013/0066571 A1* | 3/2013 | Chamarti | G01D 4/00 702/62 |
| 2013/0067375 A1* | 3/2013 | Kim | F25D 29/00 715/769 |
| 2013/0090767 A1* | 4/2013 | Bruck | F24F 11/0086 700/276 |
| 2013/0099009 A1* | 4/2013 | Filson | G05D 23/1902 236/1 C |
| 2013/0204440 A1* | 8/2013 | Fadell | F24F 11/30 700/276 |
| 2013/0216673 A1* | 8/2013 | Storek | A47J 27/62 426/509 |
| 2013/0253723 A1* | 9/2013 | Oh | G06F 1/26 700/295 |
| 2013/0268124 A1* | 10/2013 | Matsuoka | G05B 15/02 700/276 |
| 2013/0268125 A1* | 10/2013 | Matsuoka | G05D 23/1905 700/276 |
| 2013/0270251 A1* | 10/2013 | Furuti | F24C 7/083 219/445.1 |
| 2013/0289745 A1* | 10/2013 | Clark | G05B 15/02 700/9 |
| 2013/0345882 A1* | 12/2013 | Dushane | G05B 15/02 700/276 |
| 2013/0346300 A1* | 12/2013 | Kang | G05B 15/02 705/39 |
| 2014/0005809 A1* | 1/2014 | Frei | H04L 29/1249 700/90 |
| 2014/0005838 A1* | 1/2014 | Ogura | F24F 11/0086 700/276 |
| 2014/0039712 A1* | 2/2014 | Bell | G05B 13/04 700/291 |
| 2014/0058806 A1* | 2/2014 | Guenette | G05B 15/02 705/14.1 |
| 2014/0060100 A1* | 3/2014 | Bryson | H02J 3/385 62/235.1 |
| 2014/0067094 A1* | 3/2014 | Park | G05B 15/02 700/90 |
| 2014/0067131 A1* | 3/2014 | Park | A47L 15/4293 700/275 |
| 2014/0067136 A1* | 3/2014 | Kim | H04L 41/0668 700/286 |
| 2014/0088782 A1* | 3/2014 | Ogino | H02J 4/00 700/295 |
| 2014/0142728 A1* | 5/2014 | Ikezoe | G05B 19/409 700/83 |
| 2014/0148925 A1* | 5/2014 | Ahn | H02J 3/14 700/19 |
| 2014/0163751 A1* | 6/2014 | Davis | H04L 12/12 700/286 |
| 2014/0172123 A1* | 6/2014 | Lee | G05B 15/02 700/17 |
| 2014/0208957 A1* | 7/2014 | Imai | H05B 6/6435 99/342 |
| 2014/0222168 A1* | 8/2014 | Ahn | D06F 33/02 700/17 |
| 2014/0228993 A1* | 8/2014 | Minnoy | G05B 15/02 700/103 |
| 2014/0263640 A1* | 9/2014 | Heit | G06K 7/00 235/435 |

(56) References Cited

U.S. PATENT DOCUMENTS

2014/0340075 A1* 11/2014 Doi ..................... G01D 4/002
                                                          324/113
2015/0374162 A1* 12/2015 Nonaka ................. A47J 27/62
                                                          426/233

* cited by examiner

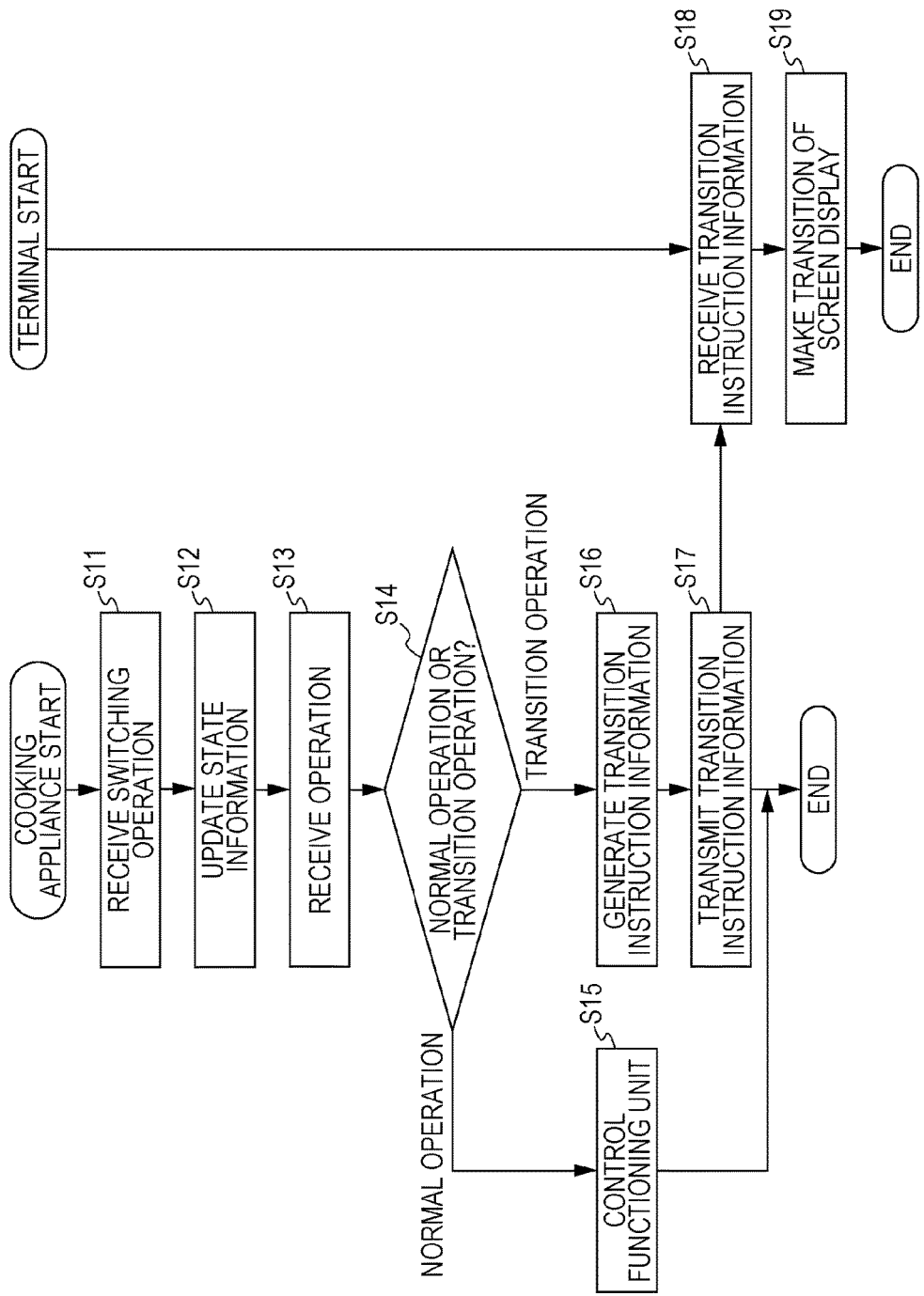

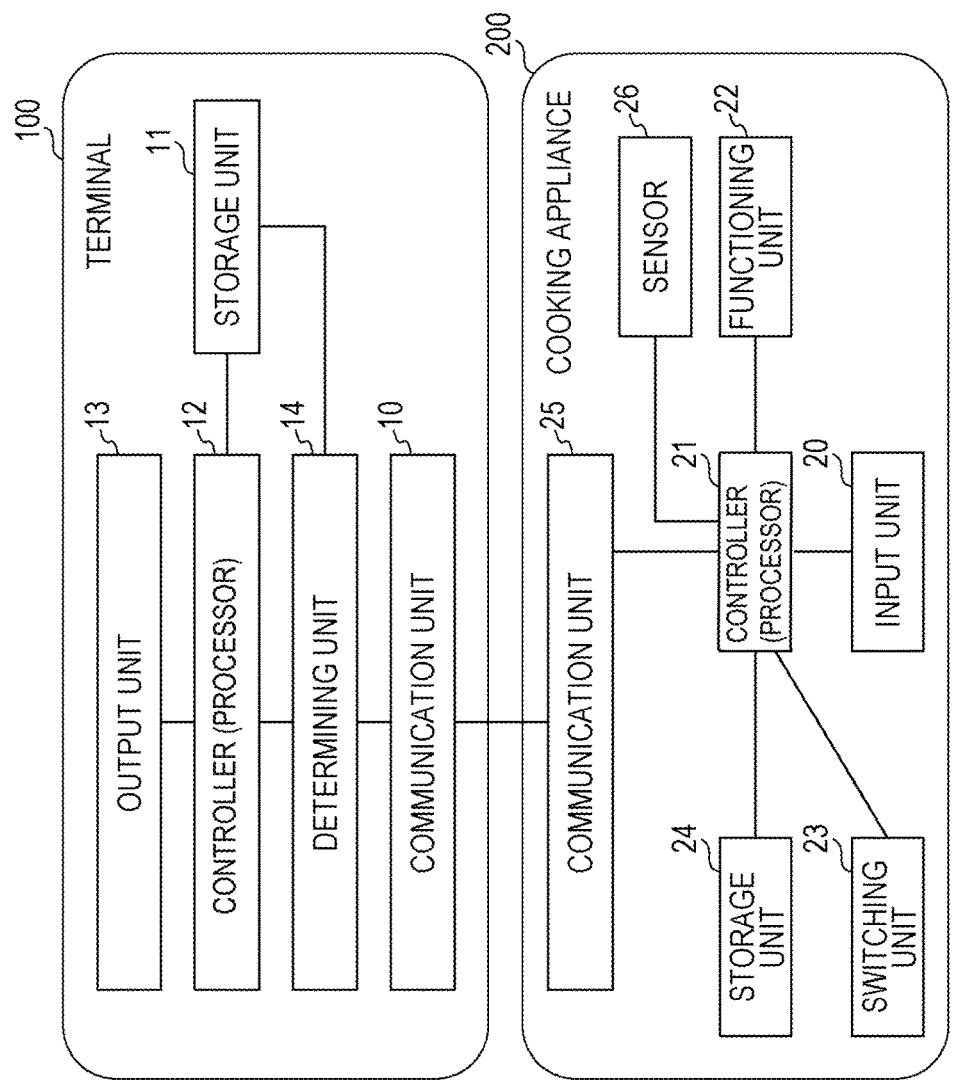

COOKING APPARATUS, INFORMATION DISPLAY APPARATUS, CONTROL METHOD, COOKING TOOL, AND NON-TRANSITORY COMPUTER-READABLE RECORDING MEDIUM

BACKGROUND

1. Technical Field

The present disclosure relates to a cooking apparatus, an information display apparatus, a control method, a cooking tool, and a non-transitory computer-readable recording medium.

2. Description of the Related Art

Heretofore, a system has been proposed which supports cooking done by a user carrying a terminal, by providing recipe information from a server to the terminal (for example, see Japanese Unexamined Patent Application Publication No. 2002-290955).

However, the above-described system needs to be further improved.

SUMMARY

In one general aspect, the techniques disclosed here feature a cooking apparatus according to an aspect of the present disclosure a cooking apparatus includes a communicator that communicates with a terminal, a link-state manager that manages link-state information indicating whether or not a link to the terminal is active, a heater that performs a heating operation on a cooking tool, a receiver that receives a user operation, and a controller that controls the communicator or the heater which is a control target, on the basis of the user operation. In the case where the link is active, when the user operation is performed on the receiver, the controller causes the communicator to transmit instruction information to the terminal. The instruction information indicates an instruction to switch an image being displayed on the information display apparatus from a first image to a second image.

According to the present disclosure, a user may switch the screen display without failure without touching the terminal.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a flowchart of an exemplary operation performed by the display control system according to the first embodiment of the present disclosure;

FIG. 5 is a block diagram illustrating an exemplary configuration of a display control system according to a second embodiment of the present disclosure;

DETAILED DESCRIPTION

Figure 1:
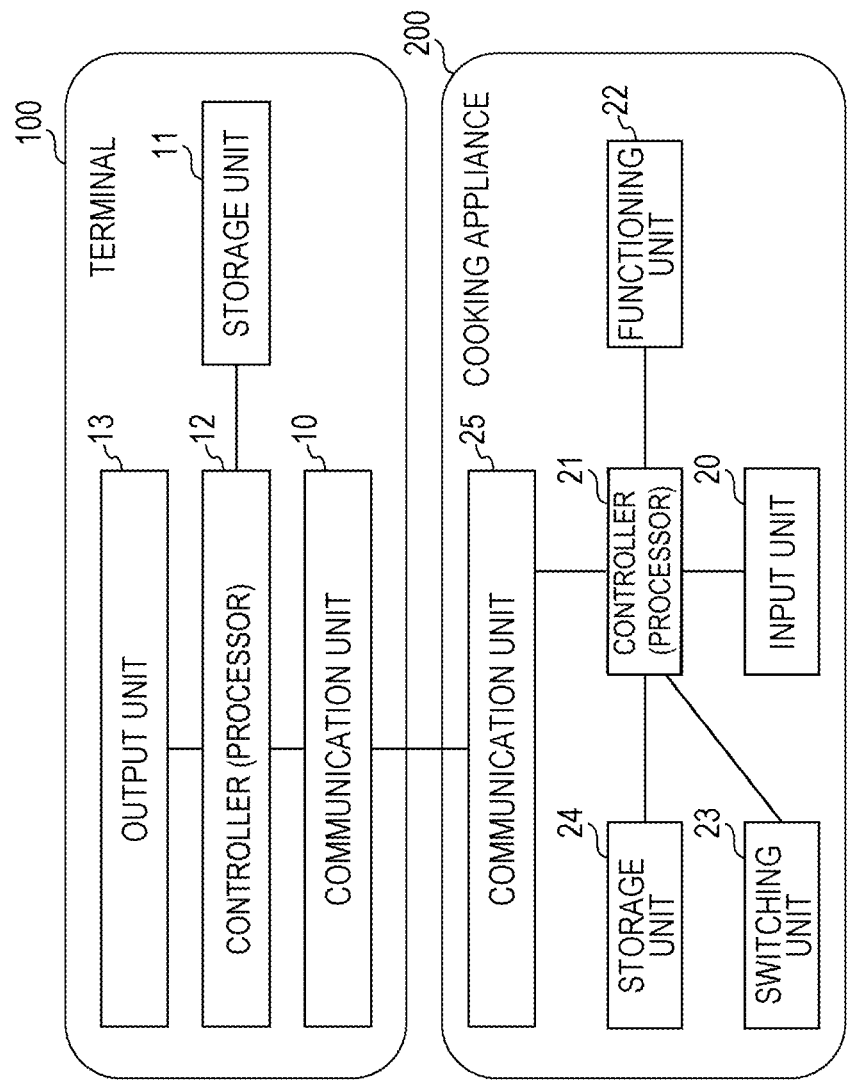
FIG. 1 is a block diagram illustrating an exemplary configuration of a display control system according to a first embodiment of the present disclosure.

Embodiments of the present disclosure will be described in detail below by referring to the drawings.

Underlying Knowledge Forming Basis of the Present Disclosure

A system has been proposed which supplies a movie showing the cooking state in each cooking process, from a server to a terminal when the terminal requests recipe information of a predetermined dish from the server. Thus, a user carrying the terminal may check the specific cooking state for each cooking process, and may smoothly do cooking (for example, see Japanese Unexamined Patent Application Publication No. 2002-290955).

However, in the above-described system, a manual operation on a screen or a voice input is used to supply an instruction to proceed the movie display. However, there has been a problem in that a user does not want to touch the terminal because the user's hands are dirty during cooking. In addition, there has been another problem in that short words in a voice input are recognized with low accuracy.

Accordingly, the present inventor examined an improvement described below.

A cooking apparatus according to an aspect of the present disclosure includes communicator that communicates with a terminal, a link-state manager that manages link-state information indicating whether or not a link to the terminal is active, a heater that performs a heating operation on a cooking tool, a receiver that receives a user operation, and a controller that controls the communicator or the heater which is a control target, on the basis of the user operation. In the case where the link is active, when the user operation is performed on the receiver, the controller causes the communicator to transmit instruction information to the terminal. The instruction information indicates an instruction to switch an image being displayed on the information display apparatus from a first image to a second image.

In the above-described aspect, each of the first image and the second image may be an image indicating a work process among a plurality of work processes including work processes performed on the cooking apparatus.

In the above-described aspect, the second image may indicate a second work process to be performed just after a first work process indicated by the first image.

In the above-described aspect, the second image may indicate a second work process to be performed just before a first work process indicated by the first image.

In the above-described aspect, the cooking apparatus may further include a switch that switches the control target of the controller through the user operation. In the case where the link is active, when the user operation is performed on the switch, the controller may control the heating operation on the heater in accordance with the user operation.

In the above-described aspect, the cooking apparatus may further include a sensor that detects the cooking tool being put on the heater. The communicator may receive link request information for requesting the link to the information display apparatus, from the information display apparatus. After the communicator receives the link request information, when the sensor detects the cooking tool being put on the heater, the communicator may transmit link response information to the information display apparatus to establish the link. The link response information may be a response to the link request information.

In the above-described aspect, when the link to the information display apparatus is established, the link-state manager may update the link-state information in such a manner that the link-state information indicates that the link is active.

In the above-described aspect, in the case where the link is not active, when the user operation is performed, the controller may control the heating operation on the heater.

In the above-described aspect, the controller may control a temperature for the heating operation on the heater.

An information display apparatus according to an aspect of the present disclosure communicates with a cooking apparatus including a communicator, a link-state manager, a heater, a receiver, and a controller. The communicator communicates with the information display apparatus. The link-state manager manages link-state information indicating whether or not a link to the information display apparatus is active. The heater performs a heating operation on a cooking tool. The receiver receives a user operation. The controller controls the communicator or the heater on the basis of the user operation. The communicator and the heater is a control target. In the case where the link is active, when the receiver receives the user operation, the controller causes the communicator to transmit instruction information to the information display apparatus. The instruction information indicates an instruction to switch an image being displayed on the information display apparatus from a first image to a second image. The information display apparatus includes a display and a display controller. The display unit displays the image. The display controller switches the image being displayed on the display from the first image to the second image on the basis of the instruction information.

In the above-described aspect, each of the first image and the second image may be an image indicating a work process among a plurality of work processes including work processes performed on the cooking apparatus.

In the above-described aspect, the second image may indicate a second work process to be performed just after a first work process indicated by the first image.

In the above-described aspect, the second image may indicate a second work process to be performed just before a first work process indicated by the first image.

A control method according to an aspect of the present disclosure is a method for controlling an operation of a cooking apparatus including a communicator, a heater, a receiver, and a computer. The communicator communicates with an information display apparatus. The heater performs a heating operation on a cooking tool. The receiver receives a user operation. The computer controls the communicator or the heater on the basis of the user operation. The communicator and the heater is a control target. The method includes, by using the computer, causing the communicator to communicate with the information display apparatus; managing link-state information indicating that a link to the information display apparatus is active; causing the heater to perform the heating operation on the cooking tool; causing the receiver to receive the user operation; controlling the control target on the basis of the user operation; and, in the case where the link is active, when receiver receives the user operation, causing the communicator to transmit instruction information to the information display apparatus, the communicator being the control target, the instruction information indicating an instruction to switch an image being displayed on the information display apparatus from a first image to a second image.

A cooking tool according to an aspect of the present disclosure is connected to an information display apparatus and a cooking apparatus via a network. The cooking tool includes a communicator, a link-state manager, an receiver, and a controller. The communicator communicates with the information display apparatus and the cooking apparatus. The link-state manager manages link-state information indicating whether or not a link to the information display apparatus is active. The receiver receives a user operation. The controller causes the communicator to transmit a control signal to the information display apparatus or the cooking apparatus on the basis of the user operation. The information display apparatus and the cooking apparatus is a control target. The control signal is a signal for controlling the control target. In the case where the link is active, when the user operation is performed, the controller causes the communicator to transmit instruction information to the information display apparatus. The instruction information indicates an instruction to switch an image being displayed on the information display apparatus from a first image to a second image.

A non-transitory computer-readable recording medium according to an aspect of the present disclosure stores a program causing a computer to execute a process for controlling an operation of a cooking apparatus including a communicator, a heater, a receiver, and a controller. The communicator communicates with an information display apparatus. The heater performs a heating operation on a cooking tool. The receiver receives a user operation. The controller controls the communicator or the heater on the basis of the user operation. The communicator and the heater is a control target. The process includes causing the communicator to communicate with the information display apparatus; managing link-state information indicating whether or not a link to the information display apparatus is active; causing the heater to perform a heating operation on the cooking tool; causing the receiver to receive the user operation; controlling the control target on the basis of the user operation; and, in the case where the link is active, when the receiver receives the user operation, causing the communicator to transmit instruction information to the information display apparatus, the instruction information indicating an instruction to switch an image being displayed on the information display apparatus from a first image to a second image, the communicator being the control target.

First Embodiment

A first embodiment of the present disclosure will be described.

The configuration of a display control system according to the first embodiment will be described by using FIG. 1. FIG. 1 is a block diagram illustrating an exemplary configuration of the display control system according to the first embodiment. As illustrated in FIG. 1, the display control system includes a terminal 100 (an exemplary information display apparatus of the present disclosure) and a cooking appliance 200 (an exemplary cooking apparatus of the present disclosure).

In FIG. 1, the terminal 100 and the cooking appliance 200 are connected to each other, for example, via a wireless network. The communication method used in the wireless network is, for example, a known near field communication system.

The configuration of the terminal 100 will be described.

The terminal 100 is an information processing apparatus, such as a smartphone or a tablet. The terminal 100 includes a communication unit 10, a storage unit 11, a controller 12, and an output unit 13. The terminal 100 may include an input unit (not illustrated), such as buttons or a touch panel, which receives a user operation.

The communication unit 10 is a communication interface for communicating with other apparatuses.

For example, the communication unit 10 receives transition instruction information transmitted from the cooking appliance 200. The transition instruction information is information for controlling transition of screen display on the terminal 100. Herein, the term "screen display" means that a certain image (for example, containing characters, figures, and symbols) is displayed on a screen. Herein, the term "transition of screen display" means that a state in which a certain image is displayed is switched to a state in which another image is displayed. An image herein is, for example, a cooking process image described below.

The storage unit 11 is a storage device, such as a memory or a hard disk.

For example, the storage unit 11 stores information about cooking process images (hereinafter referred to as cooking process image information). The cooking process images are images corresponding to respective cooking processes for a predetermined dish (recipe). The order of display of the cooking process images on a screen is predetermined.

The controller 12 is a control device such as a processor.

For example, the controller 12 reads cooking process image information from the storage unit 11, and controls the output unit 13 so that cooking process images are output on the basis of the cooking process image information. This control causes the output unit 13 to display the cooking process images on a screen.

Figure 2:
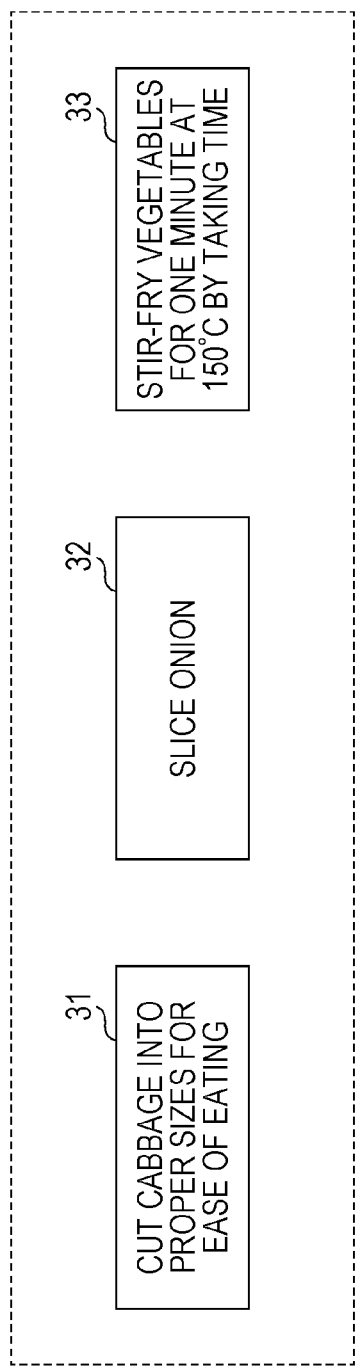
FIG. 2 is a diagram illustrating an exemplary configuration of cooking process images according to the first embodiment of the present disclosure.

FIG. 2 illustrates exemplary cooking process images. A cooking process image 31 is an image corresponding to the first cooking process. The first cooking process is the first cooking process of a predetermined dish. A cooking process image 32 is an image corresponding to the second cooking process. The second cooking process is the next cooking process of the first cooking process. A cooking process image 33 is an image corresponding to the third cooking process. The third cooking process is the next cooking process of the second cooking process, and the last cooking process of the predetermined dish. Thus, on the output unit 13, the cooking process image 31 is displayed at first; the cooking process image 32 is displayed next; and the cooking process image 33 is displayed at last.

In this example, there are three cooking processes. However, there may be two, or four or more cooking processes.

In this example, the cooking process images 31 to 33 are images containing only characters, but may contain still images or movies. Voice describing the cooking procedure may be output in addition to the display of the cooking process images 31 to 33.

As described above, the exemplary cooking process images are described.

For example, when the communication unit 10 receives transition instruction information, the controller 12 controls the output unit 13 so that a transition of the screen display is made on the basis of the transition instruction information. This control causes a transition from screen display of a predetermined cooking process image to screen display of another cooking process image to be made on the output unit 13.

An exemplary transition of screen display will be described by using FIG. 2. For example, assume that the communication unit 10 receives transition instruction information indicating an instruction to make a transition from screen display of the cooking process image 32 to screen display of the cooking process image 33. In this case, the controller 12 controls the output unit 13 so that the cooking process image 33 is generated and displayed. Thus, screen display of the cooking process image 32 is switched to screen display of the cooking process image 33 on the output unit 13. In the description below, a transition from screen display of a predetermined cooking process image to screen display of the next (succeeding) cooking process image, such as the transition from screen display of the cooking process image 32 to screen display of the cooking process image 33 as described above, is referred to as a "forward transition".

For example, assume that the communication unit 10 receives transition instruction information indicating an instruction to make a transition from screen display of the cooking process image 32 to screen display of the cooking process image 31. In this case, the controller 12 controls the output unit 13 so that the cooking process image 31 is generated and displayed. Thus, screen display of the cooking process image 32 is switched to screen display of the cooking process image 31 on the output unit 13. In the description below, a transition from screen display of a predetermined cooking process image to screen display of the previous cooking process image, such as the transition from screen display of the cooking process image 32 to screen display of the cooking process image 31 as described above, is referred to as a "backward transition".

As described above, the exemplary transition of screen display is described.

The output unit 13 is a display device such as a display. The output unit 13 may include a voice output device such as a speaker.

For example, as described above, the output unit 13 is controlled by the controller 12, thereby displaying cooking process images on a screen on the basis of the cooking process image information.

For example, as described above, the output unit 13 is controlled by the controller 12, thereby making a transition from screen display of a predetermined cooking process image to screen display of another cooking process image.

The configuration of the cooking appliance 200 will be described.

The cooking appliance 200 is, for example, an induction heating (IH) cooking device, a gas cooking stove, or a frying pan. The cooking appliance 200 includes an input unit 20, a controller 21, a functioning unit 22, a switching unit 23, a storage unit 24, and a communication unit 25.

The input unit 20 is an input device, such as a button or a touch panel, which receives a user operation.

The input unit 20 receives an operation for instructing the functioning unit 22 described below to exert its function. For example, the input unit 20 receives an operation for performing temperature setting in the heating function of the functioning unit 22. This operation is hereinafter referred to as a "normal operation".

The input unit 20 receives an operation for supplying an instruction to make a transition of screen display on the terminal 100. This operation is hereinafter referred to as a "transition operation".

The controller 21 is a control device such as a processor.

For example, when the input unit 20 receives an operation, the controller 21 reads state information from the storage unit 24 described below, and determines whether or not the operation is to be handled as a normal operation or a transition operation, on the basis of the state information. The state information is information indicating whether the input unit 20 is in the state in which a normal operation is to be received (hereinafter referred to as the normal-operation receiving state) or in the state in which a transition operation is to be received (hereinafter referred to as the transition-operation receiving state).

Therefore, when the state information indicates the normal-operation receiving state, the controller 21 handles an operation received by the input unit 20, as a normal operation. That is, the controller 21 controls the cooking appliance 200 on the basis of the instruction corresponding to the normal operation. For example, when the instruction corresponding to the normal operation is one to perform heating at 150° C., the controller 21 controls the functioning unit 22 so that heating is performed at 150° C.

In contrast, when the state information indicates the transition-operation receiving state, the controller 21 handles an operation received by the input unit 20, as a transition operation. That is, the controller 21 generates transition instruction information on the basis of the instruction corresponding to the transition operation. For example, when the instruction corresponding to the transition operation is one to make a forward transition from screen display of the cooking process image 32 to screen display of the cooking process image 33, the controller 21 generates transition instruction information for instructing the terminal 100 to make the forward transition. The controller 21 controls the communication unit 25 so that the generated transition instruction information is transmitted to the terminal 100.

The functioning unit 22 is a device which changes the condition of a target (for example, a tool, such as a pan or a frying pan, or a food material), and is, for example, a heating device such as a heater. In this example, a heating function is taken as an example, but the function of the cooking appliance 200 is not limited to this.

For example, as described above, the functioning unit 22 is controlled by the controller 21, thereby performing heating at the temperature specified by a user.

The switching unit 23 is an input device, such as a button or a touch panel, which receives a user operation.

For example, the switching unit 23 receives an operation (hereinafter referred to as a switching operation) of supplying an instruction to switch between the normal-operation receiving state and the transition-operation receiving state. The switching operation is a first switching operation of supplying an instruction to switch from the normal-operation receiving state to the transition-operation receiving state, or a second switching operation of supplying an instruction to switch from the transition-operation receiving state to the normal-operation receiving state.

Figure 3A:
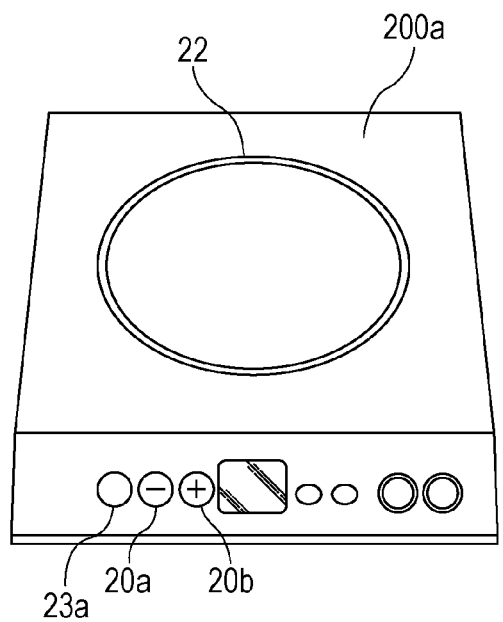
FIGS. 3A and 3B are diagrams illustrating exemplary cooking appliances according to the first embodiment of the present disclosure.
Figure 3B:
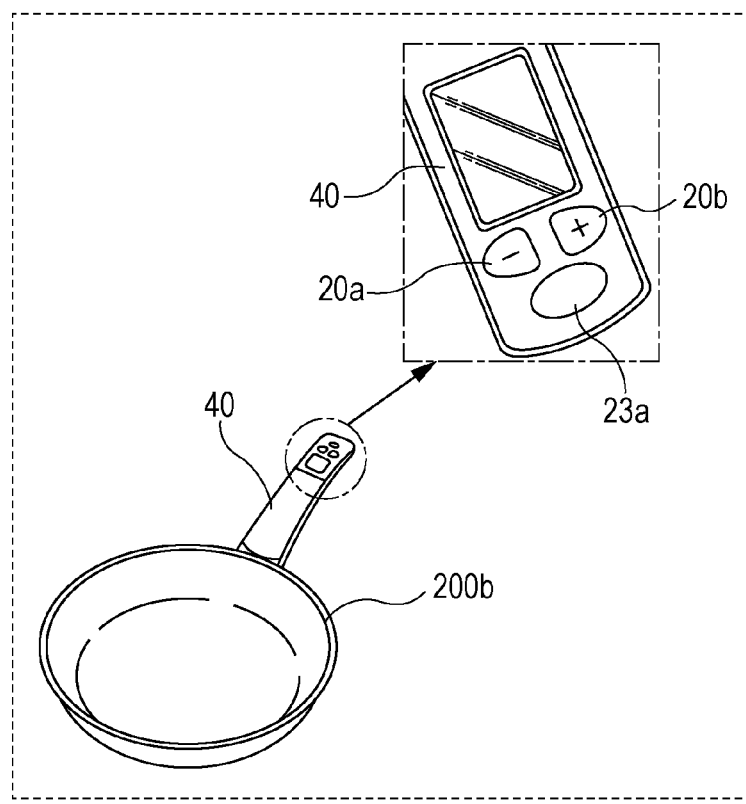

FIGS. 3A and 3B illustrate exemplary input units 20 and exemplary switching units 23. FIG. 3A illustrates a case in which the cooking appliance 200 is, for example, an IH cooking device, and FIG. 3B illustrates a case in which the cooking appliance 200 is, for example, a frying pan.

As illustrated in FIG. 3A, an IH cooking device 200a is provided with input buttons 20a and 20b which are exemplary input units 20, and with a switching button 23a which is an exemplary switching unit 23. The input buttons 20a and 20b and the switching button 23a are physical buttons pressed by a user.

For example, in the case where the first switching operation has been performed by pressing the switching button 23a, pressing of the input button 20a is handled as a transition operation of supplying an instruction to make a forward transition, and pressing of the input button 20b is handled as a transition operation of supplying an instruction to make a backward transition.

For example, in the case where the second switching operation has been performed by pressing the switching button 23a, pressing of the input button 20a is handled as a normal operation of supplying an instruction to decrease the preset temperature, and pressing of the input button 20b is handled as a normal operation of supplying an instruction to increase the preset temperature.

As illustrated in FIG. 3B, a frying pan 200b is provided with the input buttons 20a and 20b which are exemplary input units 20, and the switching button 23a which is an exemplary switching unit 23, on a handle 40. The input buttons 20a and 20b and the switching button 23a which are illustrated in FIG. 3B have the same functions as those illustrated in FIG. 3A, and will not be described.

In this example, the switching unit 23 is a device which needs to be touched (for example, pressed) by a user when an operation is to be performed, but may be a device which may receive a user operation (for example, a gesture input) performed in a non-contact manner.

The exemplary input units 20 and the exemplary switching unit 23 are described.

The storage unit 24 is a storage device, such as a memory or a hard disk.

For example, the storage unit 24 stores the state information indicating the normal-operation receiving state or the transition-operation receiving state. For example, when the switching unit 23 receives the first switching operation, the state information in the storage unit 24 is controlled by the controller 21, thereby being updated from the normal-operation receiving state to the transition-operation receiving state. For example, when the switching unit 23 receives the second switching operation, the state information in the storage unit 24 is controlled by the controller 21, thereby being updated from the transition-operation receiving state to the normal-operation receiving state.

The communication unit 25 is a communication interface for communicating with other apparatuses.

For example, as described above, the communication unit 25 is controlled by the controller 21, thereby transmitting transition instruction information to the terminal 100. As described above, the transition instruction information is received by the communication unit 10 of the terminal 100.

The configuration of the display control system according to the first embodiment is described.

An operation performed by the display control system according to the first embodiment will be described by using FIG. 4. FIG. 4 is a flowchart of an exemplary operation performed by the display control system according to the first embodiment.

The switching unit 23 of the cooking appliance 200 receives a switching operation (step S11). In this step, the switching unit 23 receives the first switching operation or the second switching operation.

The controller 21 updates the state information (step S12). For example, when the switching unit 23 receives the first switching operation, the controller 21 updates the state information in the storage unit 24 from the normal-operation receiving state to the transition-operation receiving state. For example, when the switching unit 23 receives the second switching operation, the controller 21 updates the state information in the storage unit 24 from the transition-operation receiving state to the normal-operation receiving state.

The input unit 20 receives an input operation performed by a user (step S13).

The controller 21 reads the state information from the storage unit 24, and determines whether the input operation received by the input unit 20 is handled as a normal operation or as a transition operation, on the basis of the state information (step S14).

If the state information indicates the normal-operation receiving state, the controller 21 handles the input operation received by the input unit 20, as a normal operation (NORMAL OPERATION in step S14). In this case, the controller 21 controls the function of the functioning unit 22 on the basis of the instruction corresponding to the normal operation (step S15).

In contrast, if the state information indicates the transition-operation receiving state, the controller 21 handles the input operation received by the input unit 20, as a transition operation (TRANSITION OPERATION in step S14). In this case, the controller 21 generates transition instruction information on the basis of the instruction corresponding to the transition operation (step S16). In this step, the controller 21 generates transition instruction information indicating an instruction to make a forward transition or a backward transition. The controller 21 controls the communication unit 25 so that the generated transition instruction information is transmitted to the terminal 100.

The communication unit 25 transmits the transition instruction information to the terminal 100 (step S17).

The communication unit 10 of the terminal 100 receives the transition instruction information transmitted from the communication unit 25 (step S18).

The controller 12 controls the output unit 13 so that a transition of screen display is made on the basis of the transition instruction information (step S19). Thus, a transition from screen display of a predetermined cooking process image to screen display of another cooking process image is made on the output unit 13.

As described above, the operation performed by the display control system according to the first embodiment is described.

Thus, according to the first embodiment, a user may perform a switching operation of supplying an instruction to make a transition of screen display of the terminal 100, on the cooking appliance 200. Therefore, without touching the terminal 100, the user may switch the screen display. In addition, the user manually performs a switching operation. Therefore, the screen display may be switched without fail.

Second Embodiment

A second embodiment of the present disclosure will be described. In the second embodiment, in addition to a transition of screen display based on a switching operation which is described in the first embodiment, a transition of screen display based on a value read by a sensor is available.

The configuration of a display control system according to the second embodiment will be described by using FIG. 5. FIG. 5 is a block diagram illustrating an exemplary configuration of the display control system according to the second embodiment. The same components in FIG. 1 are designated with identical reference numerals in FIG. 5. The difference between FIG. 1 and FIG. 5 will be mainly described below.

The cooking appliance 200 further includes a sensor 26 detecting the condition of a target. The sensor 26 is, for example, a weight sensor measuring the weight of a cooking tool (for example, a pan or a frying pan) which is put on the functioning unit 22, or a temperature sensor measuring the temperature of a cooking tool which is put on the functioning unit 22. The sensor 26 outputs the measured value (hereinafter referred to as a sensor value) to the controller 21.

When the controller 21 receives the sensor value from the sensor 26, the controller 21 generates information (hereinafter referred to as sensor information) including the sensor value, and controls the communication unit 25 so that the sensor information is transmitted to the terminal 100. Thus, the sensor information is transmitted from the communication unit 25 to the terminal 100, and is received by the communication unit 10 of the terminal 100.

The terminal 100 further includes a determining unit 14 which is a control device such as a processor. When the communication unit 10 receives the sensor information, the determining unit 14 reads condition information from the storage unit 11. The condition information is information indicating a condition laid down in accordance with the cooking procedure in a cooking process. For example, for the cooking procedure of a cooking process of "Put 500 cc water in a pan", a condition "the sensor value reaches 500 g" is laid down. For example, for the cooking procedure of a cooking process of "Preheat a frying pan up to 150° C.", a condition of "the sensor value reaches 150° C." is laid down.

The determining unit 14 determines whether or not the sensor value of the sensor information satisfies the condition in the condition information. If the determination result indicates that the sensor value does not satisfy the condition, the determining unit 14 waits until the communication unit 10 receives new sensor information. If the determination result indicates that the sensor value satisfies the condition, the determining unit 14 generates transition instruction information indicating an instruction to make a forward transition, and outputs the generated information to the controller 12.

When the controller 12 receives the transition instruction information from the determining unit 14, the controller 12 controls the output unit 13 so that a transition of screen display is made on the basis of the transition instruction information. Thus, a transition of the screen display from screen display of a predetermined cooking process image to screen display of the next cooking process image is made on the output unit 13.

As described above, the configuration of the display control system according to the second embodiment is described.

Figure 6:
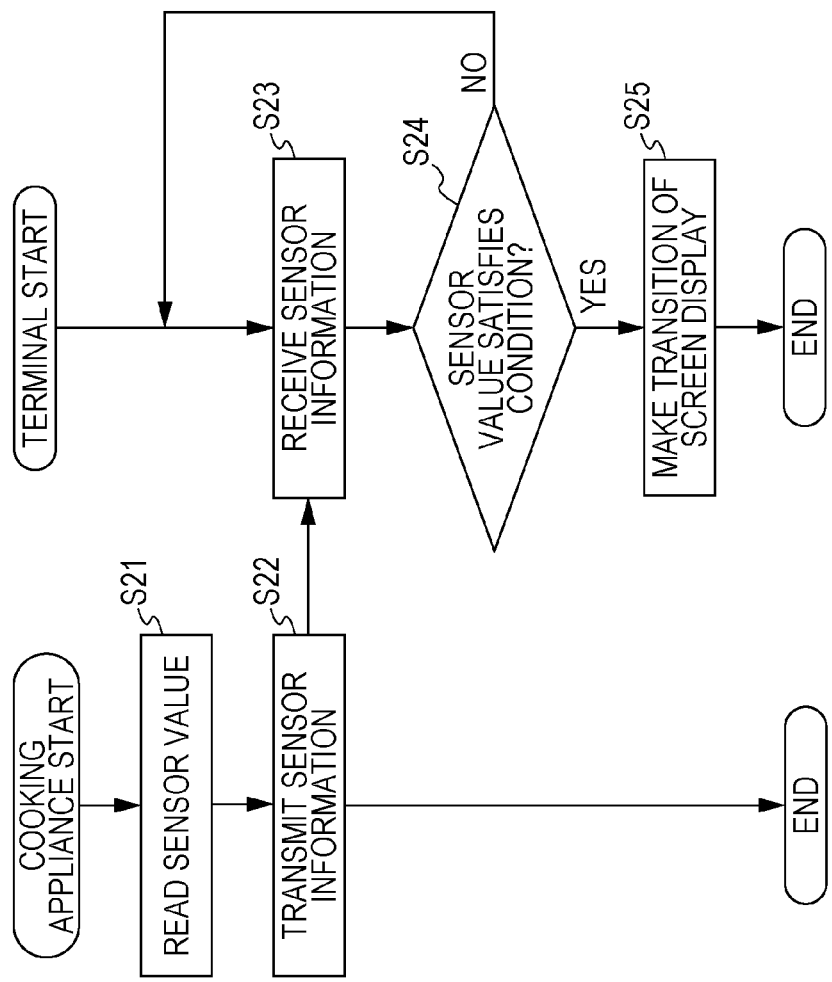
FIG. 6 is a flowchart of an exemplary operation performed by the display control system according to the second embodiment of the present disclosure.

An operation performed by the display control system according to the second embodiment will be described by using FIG. 6. FIG. 6 is a flowchart of an exemplary operation performed by the display control system according to the second embodiment.

The sensor 26 of the cooking appliance 200 reads a sensor value (step S21). For example, the sensor 26 measures the weight or the temperature of the functioning unit 22, as a sensor value, and outputs it to the controller 21. When the controller 21 receives the sensor value from the sensor 26, the controller 21 generates sensor information indicating the sensor value, and controls the communication unit 25 so that the sensor information is transmitted to the terminal 100.

The communication unit 25 transmits the sensor information to the terminal 100 (step S22).

The communication unit 10 of the terminal 100 receives the sensor information transmitted from the communication unit 25 (step S23).

When the communication unit 10 receives the sensor information, the determining unit 14 reads the condition information from the storage unit 11, and determines whether or not the sensor value in the sensor information satisfies the condition in the condition information (step S24).

If the determination result indicates that the sensor value does not satisfy the condition (NO in step S24), the determining unit 14 waits until the communication unit 10 receives a new sensor value. If the determination result indicates that the sensor value satisfies the condition (YES in step S24), the determining unit 14 generates transition instruction information indicating an instruction to make a forward transition, and outputs it to the controller 12.

When the controller 12 receives the transition instruction information from the determining unit 14, the controller 12 controls the output unit 13 so that a transition of screen display is made on the basis of the transition instruction information (step S25). Thus, a transition from screen display of a predetermined cooking process image to screen display of the next (succeeding) cooking process image is made on the output unit 13.

Thus, according to the second embodiment, a user performs the cooking procedure indicated in the cooking process image, on the cooking appliance 200, whereby a transition of screen display of the terminal 100 may be made. Thus, the user may switch the screen display without touching the terminal 100. In addition, the user manually performs a switching operation. Therefore, the screen display may be switched without fail. Further, for example, execution of a cooking procedure such as "Put 500 cc water in a pan" causes the screen display to be switched. Therefore, the user does not need to perform a switching operation using the switching unit 23.

Third Embodiment

Figure 7:
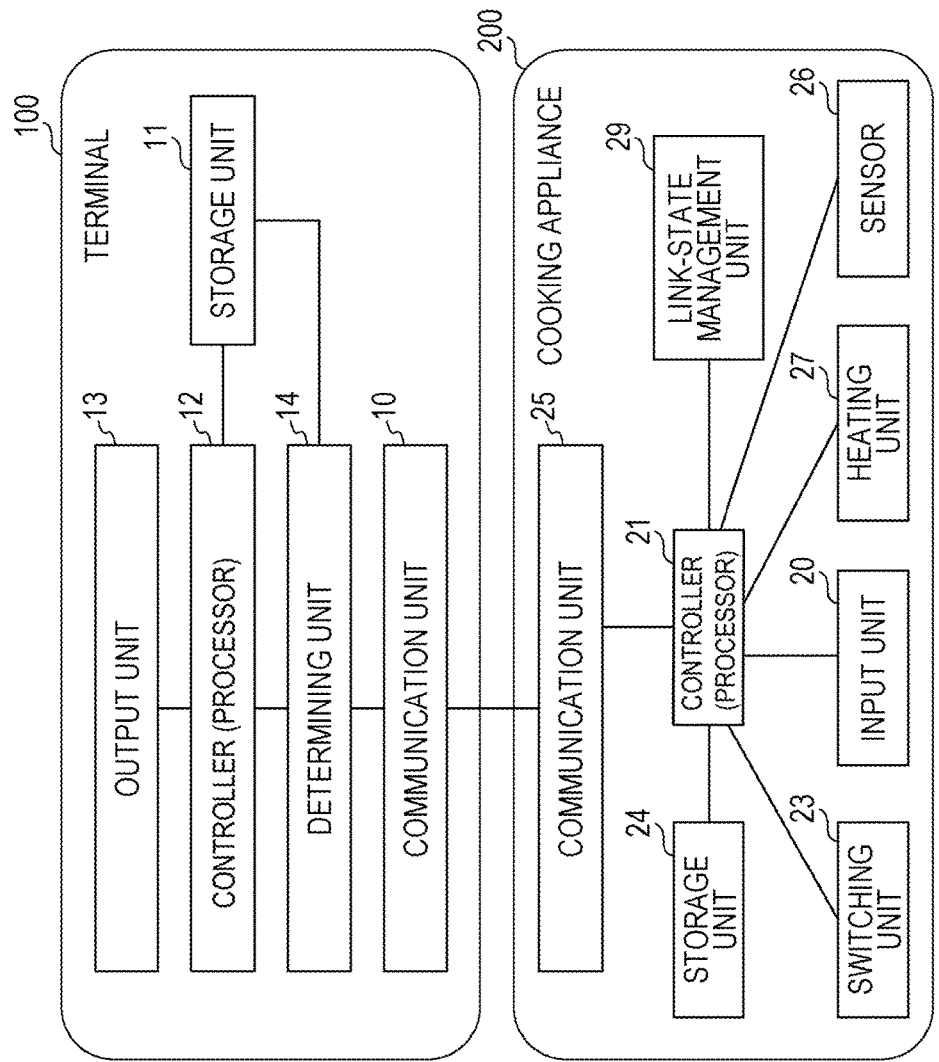
FIG. 7 is a block diagram illustrating an exemplary configuration of a display control system according to a third embodiment of the present disclosure.

A third embodiment of the present disclosure will be described. FIG. 7 is a block diagram illustrating an exemplary configuration of a display control system according to the third embodiment. As illustrated in FIG. 7, the display control system includes the terminal 100 (an exemplary information display apparatus of the present disclosure) and the cooking appliance 200 (an exemplary cooking apparatus of the present disclosure). The same components in FIG. 1 or 5 are designated with identical reference numerals in FIG. 7. In the description below, the difference between FIG. 7 and FIG. 1 or 5 will be mainly described, and repeated description will be avoided.

The cooking appliance 200 further includes a heating unit 27 which heats a cooking tool, and a link-state management unit 29 which manages link-state information indicating whether or not a link to the terminal 100 is active.

The heating unit 27 corresponds to the functioning unit 22 in FIGS. 1 and 5, and, also in the third embodiment, may be a device changing the condition of a target, not only through heating but also through other ways.

For convenience of description, the functioning unit 22 will be described as the heating unit 27.

When the controller 21 receives a link request from the terminal 100 via the communication unit 25, the controller 21 establishes a link between the terminal 100 and the cooking appliance 200. At that time, the controller 21 checks whether or not the state of the cooking appliance 200 allows a link to the terminal 100 to be established. When a link is allowed to be established, the controller 21 transmits a link response to the terminal 100 via the communication unit 25. After the controller 21 transmits the link response to the terminal 100, the controller 21 rewrites the link-state information managed by the link-state management unit 29, and causes the cooking appliance 200 to go into the link state.

As described above, the configuration of the display control system according to the third embodiment is described.

Figure 8:
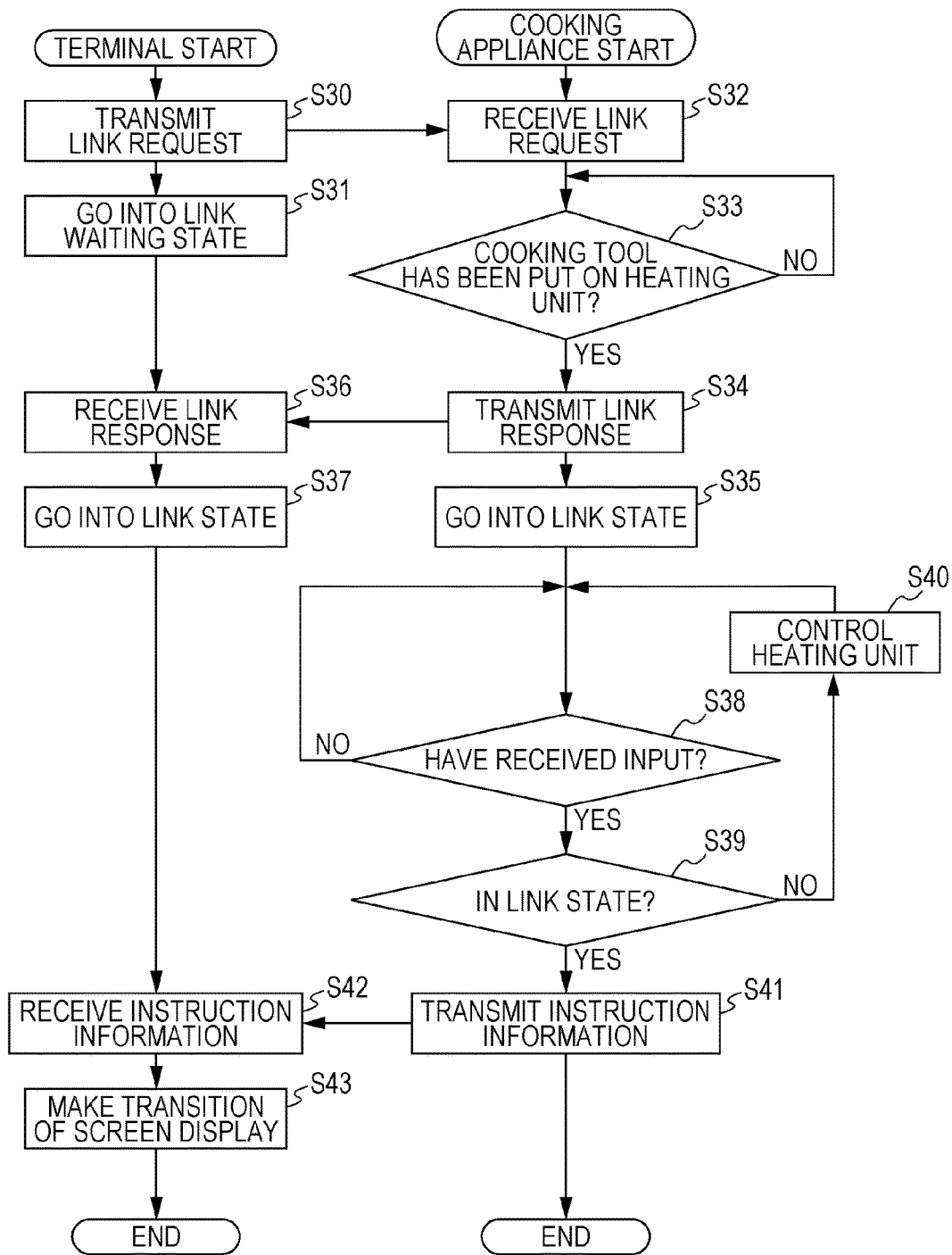
FIG. 8 is a sequence chart of an exemplary operation performed by the display control system according to the third embodiment of the present disclosure.

An operation performed by the display control system according to the third embodiment will be described by using FIG. 8. FIG. 8 is a sequence chart of an exemplary operation performed by the display control system according to the third embodiment.

The communication unit 10 of the terminal 100 transmits a link request to the cooking appliance 200 to establish the link state between the terminal 100 and the cooking appliance 200 (step S30). After transmission of the link request, the terminal 100 goes into the link waiting state (step S31). At that time, the link waiting state may be managed by the controller 12, or may be managed by a link-waiting-state management unit (not illustrated) in the terminal 100.

The communication unit 25 of the cooking appliance 200 receives the link request received from the terminal 100 (step S32). Upon reception of the link request, the controller 21 determines whether or not a cooking tool such as a frying pan has been put on the heating unit 27, on the basis of the sensor value read by the sensor 26 (step S33).

If it is determined that a cooking tool has been put (YES in step S33), the communication unit 25 transmits a link response to the terminal 100 (step S34). In contrast, if it is determined that no cooking tools have been put (NO in step S33), the process in step S33 is repeatedly performed.

After transmission of the link response to the terminal 100, the cooking appliance 200 rewrites the link-state information in the link-state management unit 29, and goes into the link state (step S35).

The communication unit 10 of the terminal 100 receives the link response (step S36), and the terminal 100 goes into the link state (step S37).

After the cooking appliance 200 goes into the link state, the controller 21 determines whether or not the input unit 20 has received an input (step S38).

If it is determined that the input unit 20 has received no inputs (NO in step S38), the process in step S38 is repeatedly performed. If it is determined that the input unit 20 has received an input (YES in step S38), the controller 21 refers to the link-state information managed by the link-state management unit 29, and determines whether or not the cooking appliance 200 is in the link state (step S39).

If the cooking appliance 200 is not in the link state (NO in step S39), the controller 21 controls the operation of the heating unit 27 on the basis of the input received by the input unit 20 (step S40).

If the cooking appliance 200 is in the link state, the communication unit 25 transmits instruction information to the terminal 100 on the basis of the input received by the input unit 20 (step S41). The instruction information at that time is information indicating an instruction to make a transition of screen display on the terminal 100 as described in the first embodiment.

The communication unit 10 of the terminal 100 receives the instruction information (step S42), and the terminal 100 makes a transition of the display screen on the basis of the received instruction information (step S43).

The exemplary operation performed by the display control system according to the third embodiment is described above. As described above, in the third embodiment, it is determined whether an input performed on the input unit 20 is to be received as a "normal operation" or a "transition operation", on the basis of information indicating whether or not the cooking appliance 200 is in the link state between the cooking appliance 200 and the terminal 100. That is, switching is performed between the normal-operation receiving state and the transition-operation receiving state depending on whether or not the link state is active.

The process in step S33 may be skipped. After the communication unit 25 receives a link request in step S32, without determining whether or not a cooking tool has been put on the heating unit 27, the communication unit 25 may transmit a link response.

At a timing at which screen display of a recipe is performed on the terminal 100, the terminal 100 may transmit a link request to the cooking appliance 200. At a timing at which a specific page in a recipe is displayed on the terminal 100, the terminal 100 may transmit a link request to the cooking appliance 200. At a timing of completion of screen display of a recipe, the terminal 100 may transmit information for requesting release of the link state, to the cooking appliance 200.

Further, it is sufficient that the terminal 100 make a transition of the display screen on the basis of the instruction information transmitted when an input (transition operation) is performed on the input unit 20 while the cooking appliance 200 is in the link state. Therefore, the terminal 100 is not necessarily provided with a function of managing the link waiting state and the link state.

In the above-described exemplary operation, the case in which a link request is transmitted from the terminal 100 to the cooking appliance 200 is described. A link request may be transmitted from the cooking appliance 200 to the terminal 100.

In the third embodiment, the case in which it is determined whether an input performed on the input unit 20 is to be received as a "normal operation" or a "transition operation" depending on whether or not the cooking appliance 200 is in the link state is described. Even when the cooking appliance 200 is in the link state, as in the description about the first embodiment, the switching unit 23 may be used to receive a switching operation.

As described above, switching is performed between the normal-operation receiving state and the transition-operation receiving state depending on whether or not the link state between the terminal 100 and the cooking appliance 200 is active. For example, if a link request is transmitted to the cooking appliance 200 upon execution of an application for displaying a recipe on the terminal 100, a user may make a transition operation valid while the user is referring to a recipe. Therefore, for example, when a user is preparing a dish which may be prepared without referring to the recipe, a state in which a transition operation is accidentally made valid, and in which a normal operation fails to be performed on the cooking appliance 200 is avoided. In addition, for example, while a user is referring to a recipe, the user may switch the screen display without fail without touching the terminal 100.

Fourth Embodiment

In the description about the third embodiment, it is assumed that the cooking appliance 200 is, for example, an IH cooking appliance or a gas cooking stove. A part of the function of the cooking appliance 200 may be provided for a cooking tool such as a frying pan. In a fourth embodiment, a case in which a part of the function of the cooking appliance 200 is provided for a cooking tool will be described.

Figure 9:
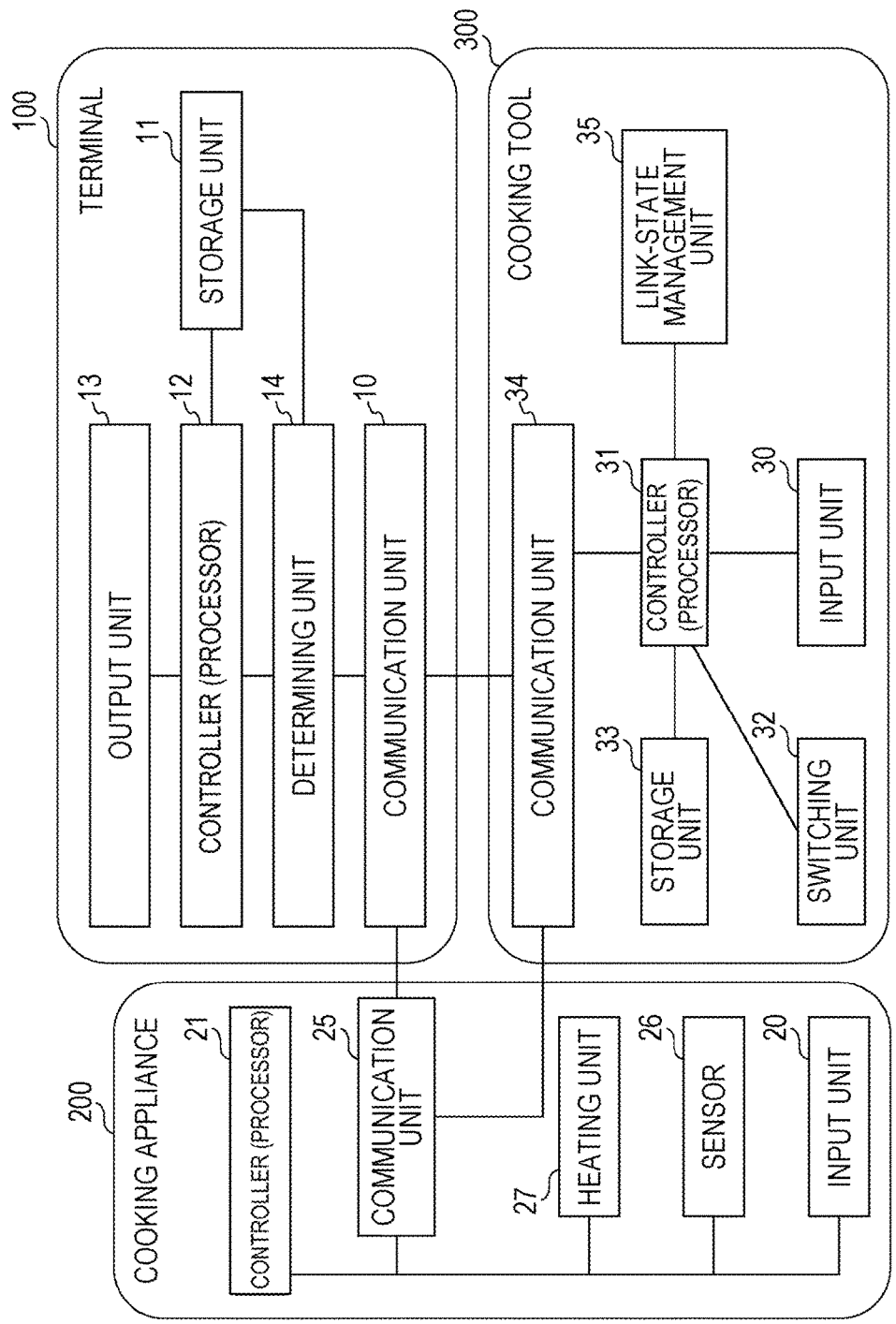
FIG. 9 is a block diagram illustrating an exemplary configuration of a display control system according to a fourth embodiment of the present disclosure.

FIG. 9 is a block diagram illustrating an exemplary configuration of a display control system according to the fourth embodiment. As illustrated in FIG. 9, the display control system includes the terminal 100 (an exemplary information display apparatus of the present disclosure), the cooking appliance 200 (an exemplary cooking apparatus of the present disclosure), and a cooking tool 300 (a cooking tool of the present disclosure). The same components in FIGS. 1, 5, and 8 are designated with identical reference numerals in FIG. 9. In the fourth embodiment, a part of the function of the cooking appliance 200 in the third embodiment is provided for the cooking tool 300. In the description below, the difference between FIG. 7 and FIG. 9 will be mainly described, and repeated description will be avoided.

The cooking tool 300 which is, for example, a cooking tool such as a frying pan includes an input unit 30, a controller 31, a switching unit 32, a storage unit 33, a communication unit 34, and a link-state management unit 35.

The input unit 30 is an input device, such as a button or a touch panel, which receives a user operation. The input unit 30 receives a normal operation for the heating unit 27 of the cooking appliance 200. In addition, the input unit 30 receives a transition operation for the terminal 100.

The controller 31 is a control device such as a processor. For example, as described below, the controller 31 controls communication with the terminal 100 or the cooking appliance 200 via the communication unit 34. The controller 31 controls operations of reading and rewriting the link-state information managed in the link-state management unit 35.

The switching unit 32 is an input device, such as a button or a touch panel, which receives a user operation. For example, the switching unit 32 receives a switching operation. The switching operation is a first switching operation of supplying an instruction to switch from the normal-operation receiving state to the transition-operation receiving state, or a second switching operation of supplying an instruction to switch from the transition-operation receiving state to the normal-operation receiving state.

The storage unit 33 is a storage device, such as a memory or a hard disk. For example, the storage unit 33 stores state information indicating the normal-operation receiving state or the transition-operation receiving state. For example, when the switching unit 32 receives the first switching operation, the state information in the storage unit 33 is controlled by the controller 31 so as to be updated from the normal-operation receiving state to the transition-operation receiving state. For example, when the switching unit 32 receives the second switching operation, the state information in the storage unit 33 is controlled by the controller 31 so as to be updated from the transition-operation receiving state to the normal-operation receiving state.

The communication unit 34 is a communication interface for communicating with other apparatuses. For example, as described above, the communication unit 34 is controlled by the controller 31 so as to be communicate with the terminal 100 and the cooking appliance 200.

The link-state management unit 35 manages link-state information indicating whether or not the link state between the cooking tool 300 and the terminal 100 is active.

The configurations of the terminal 100 and the cooking appliance 200 overlap those in the first to third embodiments, and will not be described.

As described above, the configuration of the display control system according to the fourth embodiment is described.

Figure 10:
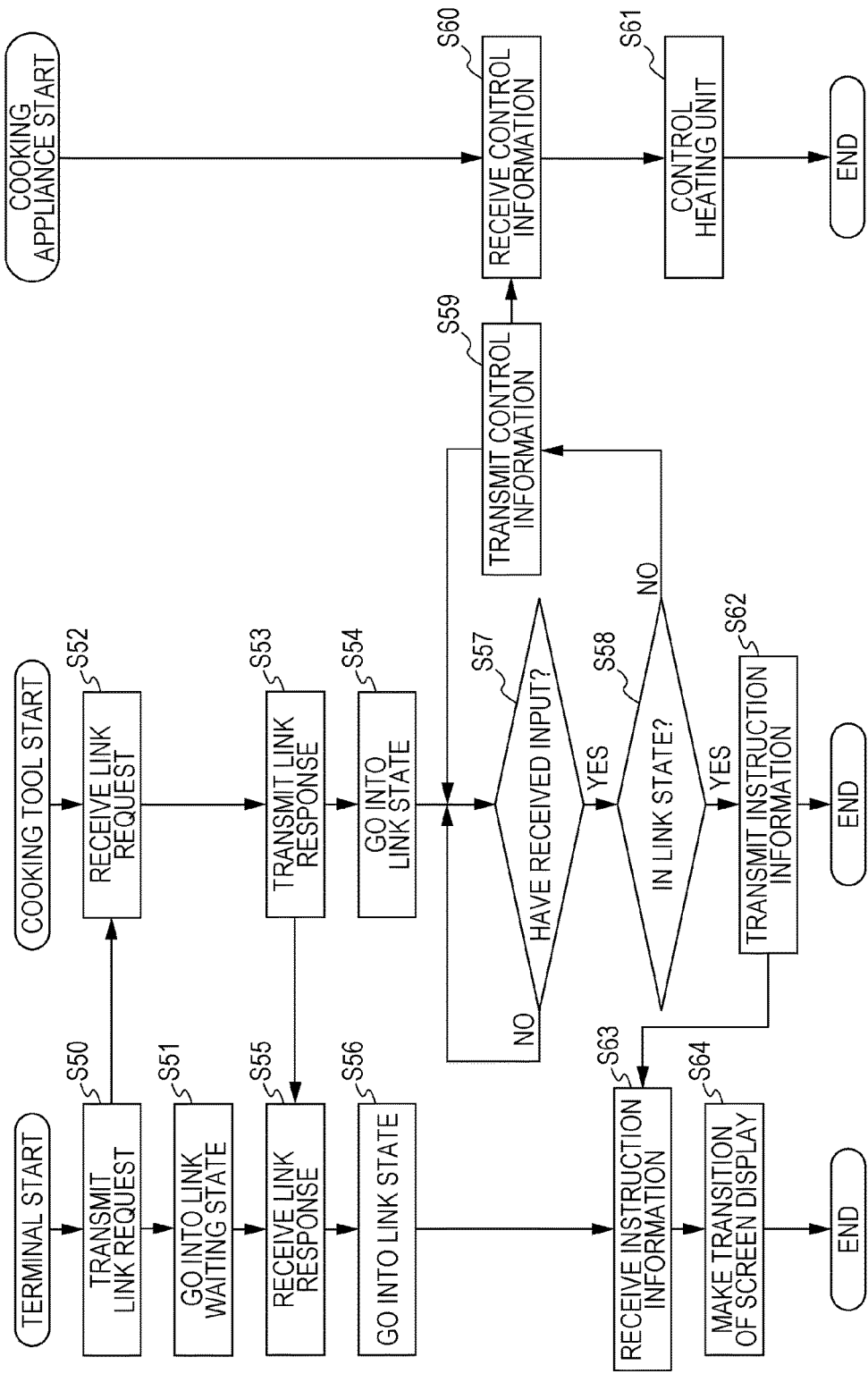
FIG. 10 is a sequence chart of an exemplary operation performed by the display control system according to the fourth embodiment of the present disclosure.

An operation performed by the display control system according to the fourth embodiment will be described by using FIG. 10. FIG. 10 is a sequence chart of an exemplary operation performed by the display control system according to the fourth embodiment.

The communication unit 10 of the terminal 100 transmits a link request to the cooking tool 300 to establish the link state between the terminal 100 and the cooking tool 300 (step S50). After transmission of the link request, the terminal 100 goes into the link waiting state (step S51). At that time, the link waiting state may be managed by the controller 12, or may be managed by the link-waiting-state management unit (not illustrated) in the terminal 100.

The communication unit 34 of the cooking tool 300 receives the link request from the terminal 100 (step S52). After reception of the link request, the communication unit 34 transmits a link response to the terminal 100 (step S53).

After the cooking tool 300 transmits the link response to the terminal 100, the cooking tool 300 rewrites the link-state information in the link-state management unit 35, and goes into the link state (step S54).

The communication unit 10 of the terminal 100 receives the link response (step S55), and the terminal 100 goes into the link state (step S56).

After the cooking tool 300 goes into the link state, the controller 31 determines whether or not the input unit 30 has received an input (step S57).

If it is determined that the input unit 30 has received no inputs (NO in step S57), the process in step S57 is repeatedly performed. If it is determined that the input unit 30 has received an input (YES in step S57), the controller 31 refers to the link-state information managed by the link-state management unit 35 to determine whether or not the cooking tool 300 is in the link state (step S58).

If the cooking tool 300 is not in the link state (NO in step S58), the controller 31 causes the communication unit 34 to transmit control information for the cooking appliance 200, on the basis of the input performed on the input unit 30 (step S59). The control information includes information for controlling the operation of the heating unit 27 of the cooking appliance 200, such as an instruction to change the preset temperature for the heating unit 27 of the cooking appliance 200.

The communication unit 25 of the cooking appliance 200 receives the control information (step S60), and the operation of heating unit 27 is controlled (step S61).

If the cooking tool 300 is in the link state (YES in step S58), the communication unit 34 transmits instruction information to the terminal 100 on the basis of the input performed on the input unit 30 (step S62). The instruction information at that time is information indicating an instruction to make a transition of screen display on the terminal 100, as described in the first embodiment.

The communication unit 10 of the terminal 100 receives the instruction information (step S63), and the terminal 100 makes a transition of screen display on the basis of the received instruction information (step S64).

The exemplary operation performed by the display control system according to the fourth embodiment is described above. As described above, in the fourth embodiment, the cooking tool 300 determines whether an input performed on the input unit 30 is to be received as a "normal operation" or a "transition operation", on the basis of information indicating whether or not the cooking tool 300 is in the link state between the cooking tool 300 and the terminal 100. That is, switching between the normal-operation receiving state and the transition-operation receiving state is performed depending on whether or not the link state is active.

After step S52, the cooking tool 300 may receive a sensor value read by the sensor 26 from the cooking appliance 200. The controller 31 determines whether or not the cooking tool 300 such as a frying pan has been put on the heating unit 27, on the basis of the received sensor value. If it is determined that the cooking tool 300 has been put, the communication unit 34 may transmit the link response to the terminal 100. If it is determined that the cooking tool 300 is not put, the communication unit 34 may receive a sensor value from the cooking appliance 200 again. Instead of receiving a sensor value from the cooking appliance 200, the communication unit 34 may directly receive information which indicates whether or not the cooking appliance 300 has been put on the heating unit 27, and which is obtained through determination that is made by the cooking appliance 200 on the basis of the sensor value.

The terminal 100 may make a transition of screen display on the basis of the instruction information transmitted when an input (transition operation) is performed on the input unit 30 when the cooking tool 300 is in the link state. Therefore, the terminal 100 is not necessarily provided with a function of managing the link waiting state and the link state.

Further, in the exemplary operation described above, the case in which the terminal 100 transmits a link request to the cooking tool 300 is described. The cooking tool 300 may transmit a link request to the terminal 100.

In the fourth embodiment, the case in which it is determined whether an input performed on the input unit 30 is to be received as a "normal operation" or a "transition operation" depending on whether or not the cooking tool 300 is in the link state is described. Even when the cooking tool 300 is in the link state, as described in the first embodiment, the switching unit 32 may be used to receive a switching operation.

As described above, switching between the normal-operation receiving state and the transition-operation receiving state is performed depending on whether or not the link state between the terminal 100 and the cooking tool 300 is active. For example, if a link request is transmitted to the cooking tool 300 when an application for displaying a recipe on the terminal 100 is to be performed, a user may make a transition operation valid while the user is referring to a recipe. Therefore, for example, when a user is preparing a menu which may be prepared without referring to the recipe, a state in which a transition operation is accidentally made valid, and in which a normal operation fails to be performed on the cooking tool 300 is avoided. In addition, for example, while a user is referring to a recipe, the user may switch the screen display without fail without touching the terminal 100.

The embodiments of the present disclosure are described above. The present disclosure is not limited to the above-described embodiments. Modified embodiments of the present disclosure will be described below.

First Modified Embodiment

In the configuration of the display control system described in the first embodiment (the configuration in FIG. 1), an exemplary case in which the cooking appliance 200 is an IH cooking device provided with two functioning units will be described. The IH cooking device is provided with the sensor 26 described in the second embodiment.

Figure 11:
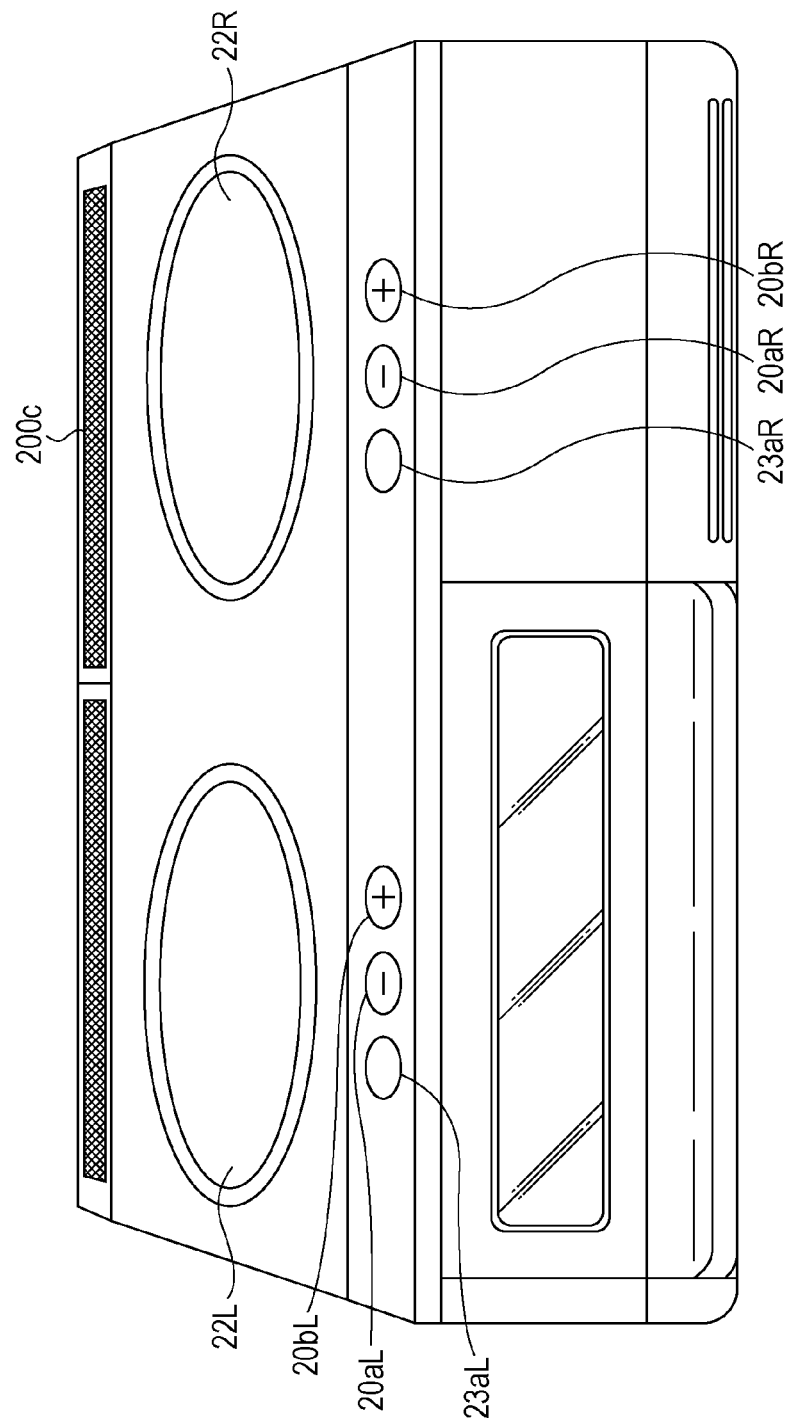
FIG. 11 is a diagram illustrating an exemplary induction heating IH cooking device according to a first modified embodiment of the present disclosure.

FIG. 11 is a diagram illustrating an exemplary IH cooking device 200c provided with functioning units 22L and 22R (exemplary functioning units 22). The functioning units 22L and 22R have a heating function. Input buttons 20aL and 20bL (exemplary input units 20) and a switching button 23aL (an exemplary switching unit 23) are provided as buttons corresponding to the functioning unit 22L. Input buttons 20aR and 20bR (exemplary input units 20) and a switching button 23aR (an exemplary switching unit 23) are provided as buttons corresponding to the functioning unit 22R. These buttons have the same functions as the input buttons 20a and 20b and the switching button 23a described in FIG. 3A.

Each of the functioning units 22L and 22R is provided with a weight sensor and a temperature sensor (exemplary sensors 26) which are not illustrated.

The storage unit 24 stores pieces of identification information which enable the functioning units 22L and 22R to be identified. Each piece of identification information which is added to the sensor information or the transition instruction information is transmitted from the cooking appliance 200c to the terminal 100.

A case in which a user cooks a dish according to a recipe A and cooks a dish according to a recipe B by using the IH cooking device 200c will be described below in turn.

Figure 12A:
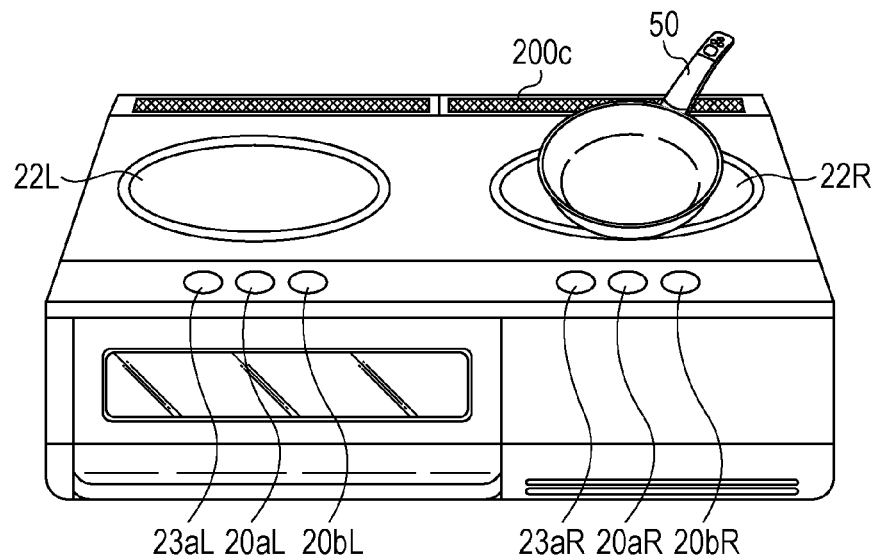
FIGS. 12A and 12B are diagrams illustrating exemplary use of the IH cooking device according to the first modified embodiment of the present disclosure.

The user starts cooking a dish according to the recipe A. A cooking process image containing text "Put a frying pan" is displayed on the terminal 100. The cooking process image is, for example, an image indicating the first cooking process of the recipe A (for example, a cooking process in which a frying pan is put on a cooking device). For example, the user who has viewed the cooking process image puts a frying pan 50 on the functioning unit 22R of the IH cooking device 200c as illustrated in FIG. 12A.

The weight sensor corresponding to the functioning unit 22R on which the frying pan 50 is put reads a weight value of the frying pan 50. The controller 21 generates weight value information (exemplary sensor information) indicating the read weight value (an exemplary sensor value), and reads the identification information of the functioning unit 22R from the storage unit 24. Then, the controller 21 controls the communication unit 25 so that the weight value information and the identification information of the functioning unit 22R are transmitted to the terminal 100. Thus, the weight value information and the identification information of the functioning unit 22R are transmitted from the communication unit 25 to the terminal 100, and are received by the communication unit 10 of the terminal 100.

When the communication unit 10 receives the weight value information and the identification information of the functioning unit 22R, the controller 12 of the terminal 100 reads the condition information from the storage unit 11. The condition information is, for example, information specifying a condition "the weight value is equal to or more than 450 g" for the first cooking process of the recipe A.

If the controller 12 determines that the weight value satisfies the condition, the controller 12 associates the recipe A with the functioning unit 22R, and stores association information indicating the association in the storage unit 11. After that, the controller 12 controls a transition of screen display on the basis of the association information. That is, when the communication unit 10 receives transition instruction information and the identification information of the functioning unit 22R, the controller 12 controls transition of screen display of the cooking process images of the recipe A on the basis of the transition instruction information. Thus, among instructions to make a transition of screen display according to the recipe A, only those received by the input buttons 20aR and 20bR corresponding to the functioning unit 22R are made valid. Therefore, when the user operates the input buttons 20aL and 20bL corresponding to the functioning unit 22L, a transition of screen display according to the recipe A is not made.

Figure 12B:
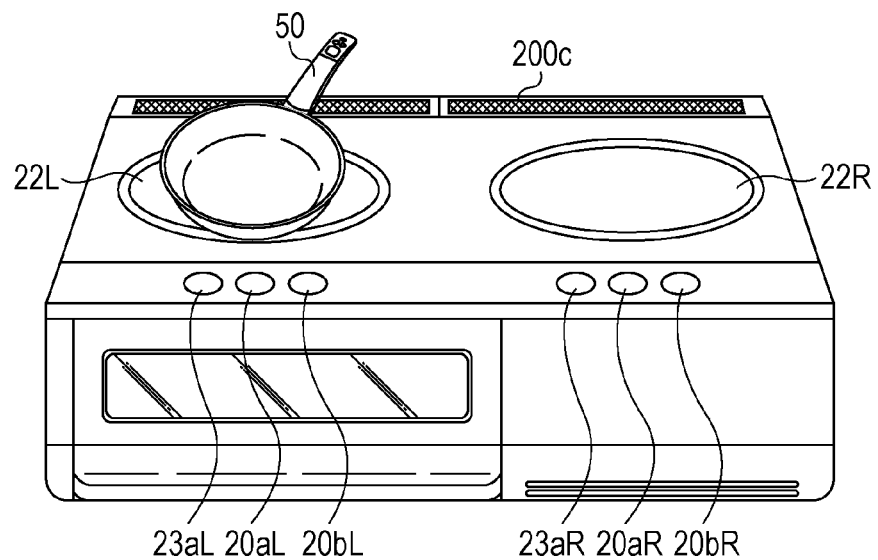

After that, for example, as illustrated in FIG. 12B, assume that the user moves the frying pan 50 from the functioning unit 22R to the functioning unit 22L. In this case, the association information (association between the recipe A and the functioning unit 22R) described above is updated. This will be described below.

The weight sensor and the temperature sensor corresponding to the functioning unit 22L output the weight value and the temperature value, respectively, which are read when the frying pan 50 is put, to the controller 21. The weight sensor and the temperature sensor corresponding to the functioning unit 22R output the weight value and the temperature value, respectively, which are read just before the frying pan 50 is removed, to the controller 21.

The controller 21 generates weight value information and temperature value information of the functioning unit 22L and weight value information and temperature value information of the functioning unit 22R. The controller 21 reads the identification information of the functioning unit 22L and the functioning unit 22R from the storage unit 24, associates the identification information of the functioning unit 22L with the weight value information and the temperature value information of the functioning unit 22L, and associates the identification information of the functioning unit 22R with the weight value information and the temperature value information of the functioning unit 22R.

The controller 21 controls the communication unit 25 so that the weight value information, the temperature value information, and the identification information of each of the functioning unit 22L and the functioning unit 22R are transmitted to the terminal 100. Thus, the above-described pieces of information are transmitted from the communication unit 25 to the terminal 100, and are received by the communication unit 10 of the terminal 100.

When the communication unit 10 receives the above-described pieces of information, the controller 12 of the terminal 100 determines whether or not the sensor values match each other. For example, the controller 12 determines whether or not the difference between the weight value indicated by the weight value information of the functioning unit 22L and that of the functioning unit 22R is within a predetermined range (for example, ±50 g). In addition, for example, the controller 12 determines whether or not the difference between the temperature value indicated by the temperature value information of the functioning unit 22L and that of the functioning unit 22R is within a predetermined range (for example, ±5° C.).

If the controller 12 determines that the determination result indicates that both of the difference for the weight value and the difference for the temperature value are within the predetermined ranges, the controller 12 updates the association information from the association between the recipe A and the functioning unit 22R to association between the recipe A and the functioning unit 22L. After that, the controller 12 controls transition of screen display on the basis of the updated association information. That is, when the communication unit 10 receives transition instruction information and the identification information of the functioning unit 22L, the controller 12 controls transition of screen display of the cooking process images of the recipe A on the basis of the transition instruction information. Thus, among instructions of screen display according to the recipe A, only those received by the input buttons 20aL and 20bL corresponding to the functioning unit 22L are made valid. Therefore, when the user operates the input buttons 20aR and 20bR corresponding to the functioning unit 22R, a transition of screen display according to the recipe A is not made.

Figure 13:
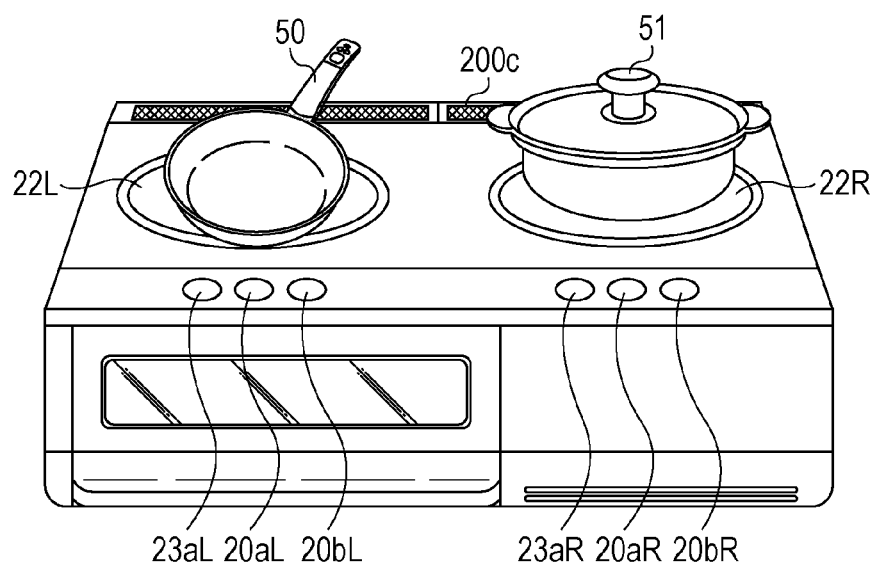
FIG. 13 is a diagram illustrating exemplary use of the IH cooking device according to the first modified embodiment of the present disclosure.

After that, for example, as illustrated in FIG. 13, assume that the user puts a pan 51 on the functioning unit 22R to cook a dish according to the recipe B. In this case, new association between the recipe B and the functioning unit 22R is made. This is similar to the association between the recipe A and the functioning unit 22R which is described above, and will not be described. After that, the controller 12 controls transition of screen display on the basis of the new association information. That is, when the communication unit 10 receives transition instruction information and the identification information of the functioning unit 22R, the controller 12 controls transition of screen display of the cooking process images of the recipe B on the basis of the transition instruction information. Thus, among instructions to make a transition of screen display according to the recipe B, only those received by the input buttons 20aR and 20bR corresponding to the functioning unit 22R are made valid. Therefore, when the user operates the input buttons 20aL and 20bL corresponding to the functioning unit 22L, a transition of screen display according to the recipe B is not made.

As described above, according to the first modified embodiment, a recipe is associated with a functioning unit on the basis of a sensor value. Therefore, even when a user cooks dishes according to different recipes by using two functioning units in parallel, the user may give an instruction to make a transition of screen display for each recipe without performing an operation of setting the above-described association.

Figure 14A:
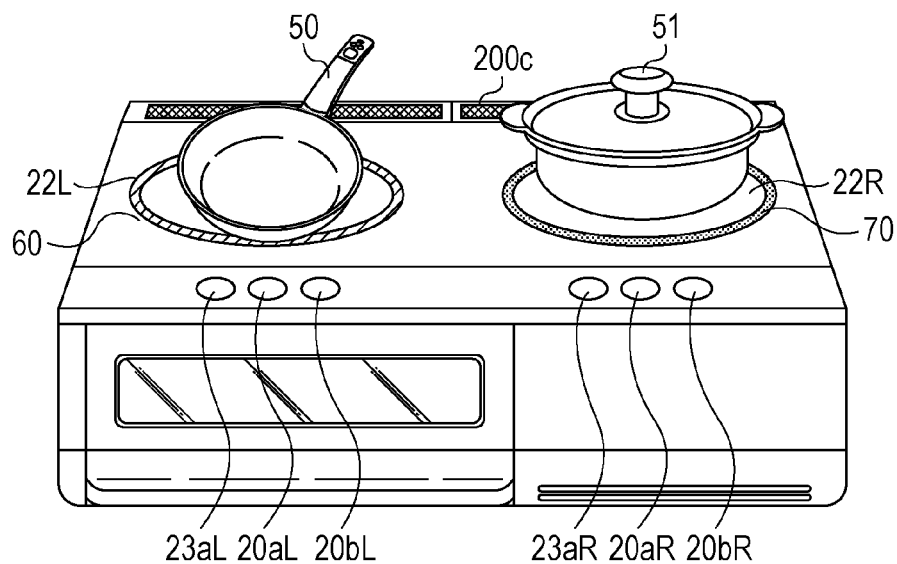
FIG. 14A is a diagram illustrating rings of the IH cooking device according to the first modified embodiment of the present disclosure.
Figure 14B:
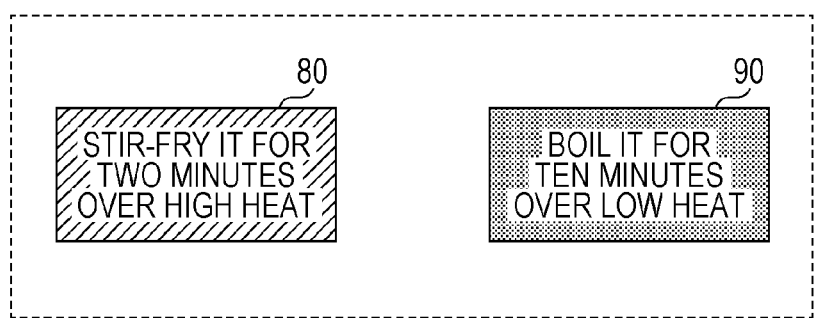
FIG. 14B is a diagram illustrating an exemplary screen display of a terminal, according to the first modified embodiment of the present disclosure.

For example, in the case where the frying pan 50 is put on the functioning unit 22L and where the pan 51 is put on the functioning unit 22R, the controller 21 exerts control so that rings corresponding to the functioning units 22L and 22R are displayed in different manners. An example is illustrated in FIG. 14A. In FIG. 14A, for example, a ring 60 corresponding to the functioning unit 22L is displayed in red, and a ring 70 corresponding to the functioning unit 22R is displayed in blue. In this case, the colors of cooking process images displayed on the terminal 100 may match the colors of the rings. An example is illustrated in FIG. 14B. In FIG. 14B, for example, a cooking process image 80 of the recipe A is displayed in red which is the color of the ring 60, and a cooking process image 90 of the recipe B is displayed in blue which is the color of the ring 70. Thus, when a user cooks dishes according multiple recipes in parallel, the user easily grasps the correspondence between a functioning unit and a cooking process image. In particular, it is effective when cooking process images of two recipes are displayed on one terminal by switching between the cooking process images.

For example, in the case where the frying pan 50 is put on the functioning unit 22L and where the pan 51 is put on the functioning unit 22R, the controller 21 may cause the ring 60 or the ring 70 to be blinked or changed in color on the basis of information (for example, the identification information of the functioning unit 22L or 22R) received from the terminal 100 so that a user grasps which recipe is one for which cooking is to be done next. In this case, for example, the terminal 100 uses the condition information described in the second embodiment. When the sensor value in the sensor information received from the cooking appliance 200 satisfies the condition of condition information corresponding to the current cooking process, the controller 12 controls the communication unit 10 so that the identification information of the functioning unit which is received along with the sensor information is transmitted back to the cooking appliance 200. When the communication unit 25 receives the identification information of the functioning unit, the controller 21 of the cooking appliance 200 exerts control so that the display manner (such as blinking or color) of the ring corresponding to the functioning unit indicated by the identification information is changed. Thus, a user may grasp which functioning unit is to be used next.

For example, when frying pans are used on multiple functioning units, acceleration sensors mounted on the frying pans may be used to determine which frying pan is being used. The controller 21 of the cooking appliance 200 determines which frying pans have been used, on the basis of the detection results obtained by the acceleration sensors, and generates transition instruction information for each frying pan. Thus, transitions of screen display of cooking process images may be differently made, for example, for the case in which a 25-cm frying pan is used and for the case in which a 15-cm frying pan is used.

The determination process (such as determination as to whether or not a sensor value satisfies the condition, or determination as to whether or not two sensor values match each other) which is performed in the terminal 100 and which is described in the second embodiment and the first modified embodiment may be performed, for example, in the cooking appliance 200.

Second Modified Embodiment

In the first to fourth embodiments, the cooking appliance 200 (for example, an IH cooking device) or the cooking tool 300 (for the sake of convenience, referred to as the cooking appliance 200 in the description below) may be automatically switched between the normal-operation receiving state and the transition-operation receiving state on the basis of the circumstances.

For example, when the power switch of the cooking appliance 200 is turned on, the controller 21 tries to communicate with the terminal (for example, tablet) 100. If the controller determines that the communication result indicates that the terminal 100 is in a state in which cooking support may be offered (for example, the application is being activated), the controller 21 updates the state information in the storage unit 24 from the normal-operation receiving state to the transition-operation receiving state. If the controller 21 determines that the communication result indicates that the terminal 100 is in a state in which no cooking support may be offered (for example, the application has been stopped), the controller 21 updates the state information in the storage unit 24 from the transition-operation receiving state to the normal-operation receiving state.

The controller 21 may try to communicate with the terminal 100 at certain intervals, and may update the state information in the storage unit 24 in accordance with the above-described determination result as appropriate.

The cooking appliance 200 may be provided with a display function (for example, a light-emitting diode (LED)) of notifying a user of whether the cooking appliance 200 is currently in the normal-operation receiving state or the transition-operation receiving state. When the controller 21 updates the state information as described above, the controller 21 controls the display function so that the updated information is indicated.

As described above, the example in which switching between the normal-operation receiving state and the transition-operation receiving state is performed depending on whether or not the terminal 100 is in the state in which cooking support may be offered is described. However, this is not limiting. For example, when a state in which a specific cooking tool (for example, a corresponding frying pan) is put on the functioning unit 22 is detected, the controller 21 may update the state information in the storage unit 24 from the normal-operation receiving state to the transition-operation receiving state.

Third Modified Embodiment

In the first to fourth embodiments, the cooking appliance 200 or the cooking tool 300 (for the sake of convenience, referred to as the cooking appliance 200 in the description below) has a configuration in which the dedicated switching unit 23 is provided as a unit of receiving a switching operation. Alternatively, a configuration may be employed in which the switching unit 23 is not provided and in which at least one input unit 20 receives a switching operation. Examples of a switching operation performed on at least one input unit 20 include an operation of pressing the input button 20a and the input button 20b illustrated in FIG. 3A at the same time, and an operation of pressing and holding the input button 20a or the input button 20b.

Fourth Modified Embodiment

In the first to fourth embodiments, the input units 20 and the switching unit 23 of the cooking appliance 200 or the cooking tool 300 (for the sake of convenience, referred to as the cooking appliance 200 in the description below) may be removable from the cooking appliance 200. For example, the input units 20 and the switching unit 23 which have been removed from the cooking appliance 200 may communicate with the cooking appliance 200 in a wireless manner. Alternatively, the input units 20 and the switching unit 23 may be connected to the cooking appliance 200 by using a magnet. In this case, whether an operation is regarded as a normal operation or a transition operation may be determined depending on the position at which the input units 20 and the switching unit 23 are put on the cooking appliance 200.

Fifth Modified Embodiment

In the first to fourth embodiments, an IH cooking device, a gas cooking stove, or a frying pan is taken as an example of the cooking appliance 200 or the cooking tool 300 (for the sake of convenience, referred to as the cooking appliance 200 in the description below). The cooking appliance 200 may be, for example, a microwave oven, a digital scale, a seasoning container with an acceleration sensor, or a cooking thermometer. Examples of this will be described below.

A case in which the cooking appliance 200 is a microwave oven will be described. For example, assume that a cooking process image containing a message "Open the door of a microwave oven" is displayed on the output unit 13 of the terminal 100, and that a user who has read the message opens the door of a microwave oven. When the microwave oven detects opening of the door, the microwave oven generates transition instruction information indicating an instruction to make a forward transition, and transmits the information to the terminal 100. After that, the terminal 100 makes a transition of screen display on the basis of the transition instruction information.

A case in which the cooking appliance 200 is a digital scale will be described. For example, assume that a cooking process image containing a message "Measure two grams of salt" is displayed on the output unit 13 of the terminal 100, and that a user who has read the message puts two grams of salt on a digital scale. When the digital scale detects two grams of salt, the digital scale generates transition instruction information indicating an instruction to make a forward transition, and transmits the information to the terminal 100. After that, the terminal 100 makes a transition of screen display on the basis of the transition instruction information.

A case in which the cooking appliance 200 is a seasoning container with an acceleration sensor (hereinafter referred to as a container) will be described. For example, assume that a cooking process image containing a message "Shake the salt container five times" is displayed on the output unit 13 of the terminal 100, and that a user who has read the message shakes the salt container five times. When the container uses the acceleration sensor to detect the state in which the container has been shaken five times, the container generates transition instruction information indicating an instruction to make a forward transition, and transmits the information to the terminal 100. After that, the terminal 100 makes a transition of screen display on the basis the transition instruction information.

A case in which the cooking appliance 200 is a cooking thermometer will be described. For example, assume that a cooking process image containing a message "Heat the meat until the temperature of a center portion reaches 50° C." is displayed on the output unit 13 of the terminal 100, and that a user who has read the message inserts a cooking thermometer into the center portion of the meat and heats the meat. When the cooking thermometer detects 50° C., the cooking thermometer generates transition instruction information indicating an instruction to make a forward transition, and transmits the information to the terminal 100. After that, the terminal 100 makes a transition of screen display on the basis of the transition instruction information.

Sixth Modified Embodiment

In the first to fourth embodiments, the cooking appliance 200 or the cooking tool 300 (for the sake of convenience, referred to as the cooking appliance 200 in the description below) is used as equipment communicating with the terminal 100. This is not limiting. The equipment communicating with the terminal 100 may be any as long as the equipment is used, for example, when work constituted by multiple processes (for example, construction of a piece of furniture or the like, or setting of electronic equipment or the like) is done. Alternatively, the equipment communicating with the terminal 100 may be, for example, a kitchen speaker with which a user may listen to television sound, music, or the like while the user is in the kitchen. A normal operation in the kitchen speaker is, for example, an operation of supplying an instruction to select a television channel or music.

The modified embodiments for the first to fourth embodiments of the present disclosure are described above. The above-described modified embodiments may be combined with each other.

Implementation Example Using Program

The embodiments and modified embodiments according to the present disclosure are described in detail by referring to the drawings. The functions of the terminal 100, the cooking appliance 200, the cooking tool 300 (hereinafter referred to as the apparatuses), and the like which are described above may be implemented by using programs.

Figure 15:
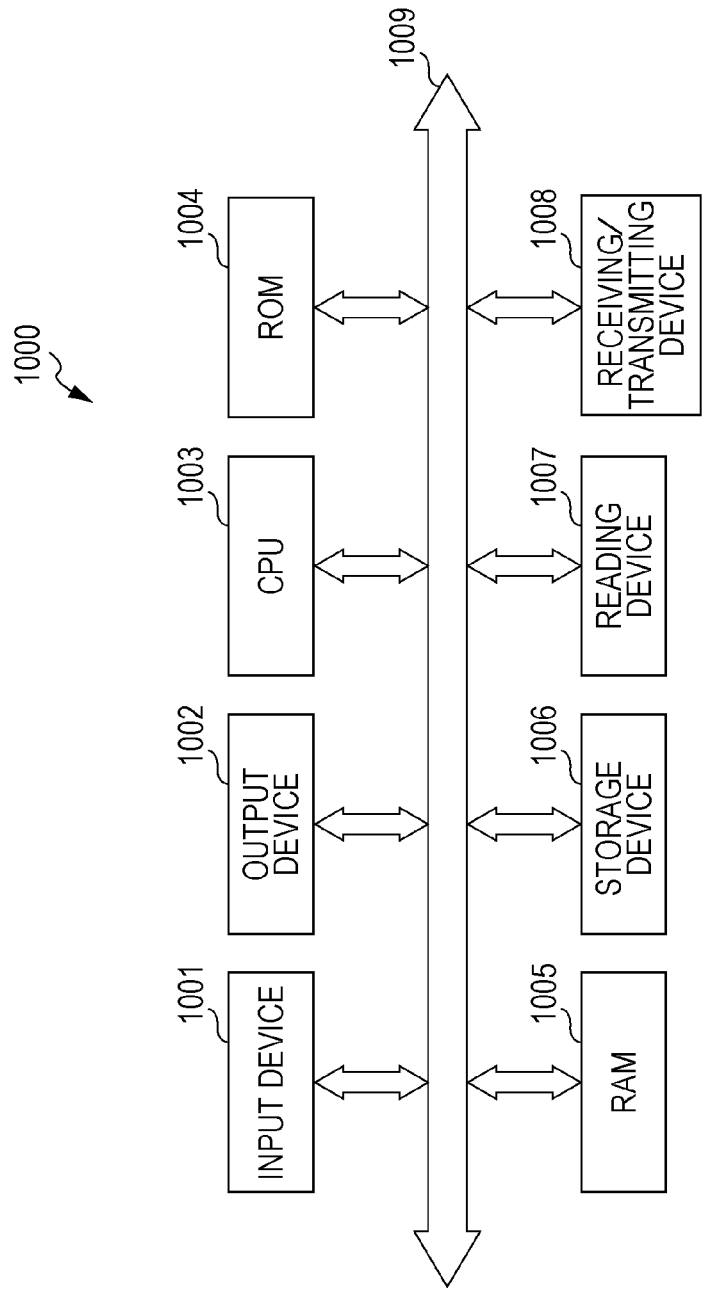
FIG. 15 is a diagram illustrating an exemplary hardware configuration of a computer achieving, by using software, functions of a terminal according to the first to fourth embodiments of the present disclosure.

FIG. 15 is a diagram illustrating the hardware configuration of a computer for achieving the functions of the units by using programs. A computer 1000 includes an input device 1001, such as an input button or a touch pad, an output device 1002, such as a display or a speaker, a central processing unit (CPU) 1003, a read only memory (ROM) 1004, and a random access memory (RAM) 1005. The computer 1000 further includes a storage device 1006, such as a hard disk device or a solid state drive (SSD), a reading device 1007 which reads information from a recording medium, such as a digital versatile disk read only memory (DVD-ROM) or a Universal Serial Bus (USB) memory, and a receiving/transmitting device 1008 which communicates via a network. The units described above are connected through a bus 1009.

The reading device 1007 reads programs for achieving the functions of the units, from a recording medium storing the programs, and stores the programs in the storage device 1006. Alternatively, the receiving/transmitting device 1008 communicates with a server connected to a network, and stores the programs which are downloaded from the server and which are used to achieve the functions of the units, in the storage device 1006.

The CPU 1003 copies the programs stored in the storage device 1006 into the RAM 1005, and sequentially reads instructions included in the programs, from the RAM 1005 for execution, achieving the functions of the units. In execution of the programs, the RAM 1005 or the storage device 1006 store information which is obtained in the various processes described in the embodiments, and which is used as appropriate.

The present disclosure is suitable for use of a cooking apparatus, an information display apparatus, a control method, a cooking tool, and a program which are used in work constituted by multiple processes.

What is claimed is:

1. A cooking appliance comprising:
    a communication interface that communicates with a display via a network, the display being physically separately provided from the cooking apparatus and configured to display an image indicating a cooking process comprising a recipe, the image being read from a memory included in the display;
    a heater that performs a heating operation on a cooking tool based on the recipe;
    a user interface that accepts a user operation; and
    a processor that controls one of the communication interface and the heater, in response to the user operation,
    wherein, when the communication interface receives a request, sent from the display to the cooking appliance, for linking the display to the cooking appliance through the network, the processor transmits, to the display, a response indicating acceptance of the request, to establish a link between the cooking apparatus and the display through the network via the communication interface,
    when the user interface accepts the user operation and the link between the cooking apparatus and the display is established through the network via the communication interface, the processor causes the communication interface to transmit instruction, to the display, to cause the display to switch an image being displayed on the display from a first image to a second image, and does not cause the heater to control heating applied on the cooking tool,
    when the user interface accepts the user operation and the link between the cooking apparatus and the display is not established through the network, the processor causes the heater to control heating applied on the cooking tool, and does not cause the display to switch an image being displayed on the display,
    wherein the first image indicates a first cooking process comprising the recipe,
    wherein the second image indicates a second cooking process, comprising the recipe, to be performed just after the first cooking process, or to be performed just before the first cooking process, and
    wherein the first cooking process and the second cooking process are performed on the cooking appliance.

2. The cooking appliance according to claim 1, further comprising:
    a sensor that detects the cooking tool positioned on the heater,
    wherein the processor causes the communication interface to transmit the response to the display, indicating the acceptance of the request, when the sensor detects the cooking tool positioned on the heater.

3. The cooking appliance according to claim 1,
wherein the processor controls a temperature for the heating operation on the heater.

4. The cooking appliance according to claim 1, wherein,
when the user interface accepts the user operation after the communication interface receives the request, from the display to the cooking appliance for linking the display to the cooking appliance through the network, the processor determines whether or not the link between the cooking appliance and the display is established through the network via the communication interface, and
when the processor determines that the link between the cooking appliance and the display is established, the processor causes the communication interface to transmit the instruction to the display.

5. A cooking tool connected to a display and a cooking appliance having a heater via a network, the cooking tool comprising:
a communication interface that communicates with the display via a network and the cooking appliance, the display being physically separately provided from the cooking tool and configured to display an image indicating a cooking process comprising a recipe, the image being read from a memory included in the display;
a user interface that accepts a user operation; and
a processor that causes the communication interface to transmit a control signal to one of the display and the cooking appliance, in response to the user operation, the control signal controlling the one of the display and the cooking appliance, which receives the control signal,
wherein, when the communication interface receives a request, sent from the display to the cooking tool, for linking the display to the cooking tool through the network, the processor transmits, to the display, a response indicating acceptance of the request, to establish a link between the cooking tool and the display through the network via the communication interface,
when the user interface accepts the user operation and the link between the cooking tool and the display is established through the network via the communication interface, the processor causes the communication interface to transmit the control signal, to the display, to cause the display to switch an image being displayed on the display from a first image to a second image, and does not cause the communication interface to transmit the control signal, to control heating applied on the cooking tool by the heater,
when the user interface accepts the user operation and the link between the cooking tool and the display is not established through the network, the processor causes the communication interface to transmit the control signal to the cooking appliance, to control heating applied on the cooking tool by the heater, and does not transmit the control signal to cause the display to switch an image being displayed on the display,
wherein the first image indicates a first cooking process comprising the recipe,
wherein the second image indicates a second cooking process, comprising the recipe, to be performed just after the first cooking process, or to be performed just before the first cooking process, and
wherein the first cooking process and the second cooking process are performed on the cooking appliance.

6. The cooking tool according to claim 5, wherein,
when the user interface accepts the user operation after the communication interface receives the request, from the display to the cooking tool for linking the display to the cooking tool, the processor determines whether or not the link between the cooking tool and the display is established through the network via the communication interface, and
when the processor determines that the link between the cooking tool and the display is established, the processor causes the communication interface to transmit the control signal to the display.

* * * * *